United States Patent
Dudar

(10) Patent No.: US 10,940,854 B2
(45) Date of Patent: Mar. 9, 2021

(54) SYSTEMS AND METHODS FOR REDUCING VEHICLE EVAPORATIVE EMISSIONS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 175 days.

(21) Appl. No.: 16/204,775

(22) Filed: Nov. 29, 2018

(65) Prior Publication Data

US 2020/0172088 A1 Jun. 4, 2020

(51) Int. Cl.
| | |
|---|---|
| *B60W 30/06* | (2006.01) |
| *F02D 41/22* | (2006.01) |
| *G05D 1/00* | (2006.01) |
| *G06Q 10/02* | (2012.01) |
| *G08G 1/14* | (2006.01) |

(52) U.S. Cl.
CPC ............ *B60W 30/06* (2013.01); *F02D 41/22* (2013.01); *G05D 1/0088* (2013.01); *G06Q 10/02* (2013.01); *B60W 2400/00* (2013.01); *B60W 2555/20* (2020.02); *B60W 2900/00* (2013.01); *F02D 2041/225* (2013.01); *G05D 2201/0212* (2013.01); *G05D 2201/0213* (2013.01)

(58) Field of Classification Search
CPC .... F02D 41/00; F02D 41/22; F02D 2041/225; F02D 2041/26; F02M 25/08; G08G 1/14; G08G 1/143; G08G 1/146; G08G 1/147; B60W 30/06; G06Q 10/02

USPC .......................................................... 701/23
See application file for complete search history.

(56) References Cited

U.S. PATENT DOCUMENTS

| | | |
|---|---|---|
| 9,512,791 B1 | 12/2016 | Dudar et al. |
| 9,892,639 B2 * | 2/2018 | Ullrich .................. G07B 15/02 |
| 2013/0231824 A1 * | 9/2013 | Wilson ............... G01C 21/3415 701/26 |
| 2015/0123818 A1 * | 5/2015 | Sellschopp ...... G08G 1/096816 340/932.2 |
| 2017/0002751 A1 * | 1/2017 | Tatavarthi ........... F02D 13/0207 |
| 2017/0039779 A1 | 2/2017 | Vander Helm et al. |
| 2017/0234246 A1 | 8/2017 | Dudar |
| 2019/0092315 A1 * | 3/2019 | Huh ........................ B60L 58/21 |
| 2019/0102509 A1 * | 4/2019 | Thibault ................ G06Q 10/00 |
| 2019/0382001 A1 * | 12/2019 | Chelian ................. B60W 30/06 |

OTHER PUBLICATIONS

Dudar, A., "Systems and Methods for Expedited Vehicle Soak," U.S. Appl. No. 15/990,222, filed May 25, 2018, 83 pages.

* cited by examiner

*Primary Examiner* — Tan Q Nguyen
(74) *Attorney, Agent, or Firm* — Geoffrey Brumbaugh; McCoy Russell LLP

(57) ABSTRACT

Methods and systems are provided for reducing bleed emissions and exhaust emissions from a vehicle that may be operated autonomously as well as part of a car-sharing model. A parking location of the vehicle is selected at the end of a vehicle event requested by an operator as a function of fuel system and evaporative emissions system variables such that the solar loading of the parking location enables reduced emissions. The parking location selection is further coordinated with the pick-up time and location of a subsequent vehicle event requested by another vehicle operator.

18 Claims, 10 Drawing Sheets

700

| Variable | Higher weight | Lower weight |
|---|---|---|
| Fuel tank size | Smaller size | Larger size |
| Fuel tank material | Plastic | Metal |
| Fuel tank configuration | Multiple vents/openings | Single vent/opening |
| Canister config. | No bleed canister | Bleed canister available |
| Canister load | Higher load | Lower load |
| Canister size | Smaller size | Larger size |
| Ambient condition | Higher temperature | Lower temperature |
| Fuel type | Higher RVP/octane/alcohol | Lower RVP/octane/alcohol |
| FTIV | Leaky | Functional |
| DTC | Set | Not set |
| State emissions regn. | Lower threshold | Higher threshold |

FIG. 7

SYSTEMS AND METHODS FOR REDUCING VEHICLE EVAPORATIVE EMISSIONS

FIELD

The present description relates generally to methods and systems for operating a vehicle to minimize bleed emissions from an associated evaporative emissions system.

BACKGROUND/SUMMARY

Vehicles may be configured with an evaporative emissions system ("Evap") to store refueling vapors, running-loss vapors, and diurnal emissions in a fuel vapor canister, and then purge the stored vapors during a subsequent engine operation. The stored vapors may be routed to engine intake for combustion, further improving fuel economy for the vehicle. In a typical canister purge operation, a canister purge valve coupled between the engine intake and the fuel vapor canister is opened, allowing for intake manifold vacuum to be applied to the fuel vapor canister. Fresh air may be drawn through the fuel vapor canister via an open canister vent valve. This configuration facilitates desorption of stored fuel vapors from the adsorbent material in the canister, regenerating the adsorbent material for further fuel vapor adsorption.

However, engine run time in hybrid vehicles and plug-in hybrid vehicles may be limited, and thus opportunities for purging fuel vapor from the canister may also be limited. If the vehicle is refueled, saturating the canister with fuel vapor, and then parked in a hot, sunny location prior to a purge event, the canister may desorb fuel vapors as it warms up, leading to bleed emissions. In addition, the fuel may also heat up, generating more fuel vapors. For vehicles that vent the fuel tank during a vehicle-off condition, the volatization of fuel under similar conditions may overwhelm the capacity of the fuel vapor canister.

Various approaches have been developed to address this issue. One example approach disclosed by Dudar et al. in U.S. Pat. No. 9,512,791. Therein, canister cooling elements, optionally powered by solar cells, are operated to cool the canister during conditions when bleed emissions are likely to occur. The cooling operation is intended to reduce the bleed emissions from being generated. Still other approaches include redirecting bleed emissions towards an engine intake to trap the fuel vapors in a hydrocarbon trap coupled to the engine's air intake system (AIS).

However the inventors herein have recognized that such approaches require the presence of additional components to the vehicle system, such as cooling elements, solar cells, purge pumps, dual canister purge valves, NIRCOS sealed fuel tanks, and AIS traps. These components can add cost and control complexity. As another example, if an evaporative emissions test is not passed, CARB carbon credits may be lost.

In addition to limiting purging opportunities, the reduced engine run time in hybrid vehicles can also limit opportunities for conducting a leak test on the evaporative emissions system. If a diagnostic test code (DTC) sets responsive to a leaky Evap system, the code may remain set for a long time (e.g., weeks or months) before the vehicle is serviced to address the leak and remove the code. This is because the leak does not degrade fuel economy or affect drivability. However, the Evap leak does increase emissions, which may become more pronounced with sun loading on the vehicle.

The inventors herein have recognized that hybrid vehicles with autonomous capabilities can be leveraged to reduce bleed emissions. Autonomous vehicles (AVs) are able to assume certain vehicle tasks otherwise handled by a traditional vehicle driver. For example, autonomous vehicles can navigate to a specific destination by controlling the steering, acceleration, braking, etc., by relying on sensors or other resources to detect nearby vehicles, pedestrians, and objects in or near the road. The AV is controlled according to the signals output by such sensors. In addition, future autonomous vehicles are envisioned as participating in car sharing or ride sharing models. Thus, when an AV reaches a final destination, there may be flexibility and opportunity to park the vehicle in a space that is not subject to sun loading. In particular, a parking location for the vehicle may be selected to reduce the potential for bleed emissions from a fuel system or evaporative emissions system of the vehicle. As one example, bleed emissions may be reduced by a method comprising: selecting a parking location for a vehicle based on a propensity for bleed emissions and/or cold-start exhaust emissions over a duration of vehicle parking; and navigating the vehicle to the selected parking location.

As an example, a vehicle controller may include instructions for operating a first metric on-board the vehicle that estimates the potential for bleed emissions when the vehicle is parked at the end of a current drive cycle. The first metric may account for a plurality of variables related to an integrity of the fuel system and/or Evap system of the vehicle while it is being propelled as well as their anticipated state at the end of the drive cycle. For example, the metric may account for ambient temperature, fuel temperature, fuel type (e.g., fuel seasonal grade, fuel octane rating, fuel alcohol content, fuel composition, etc.), fuel tank configuration (size, construction material, location and number of openings, etc.), fuel system DTCs, vehicle powertrain configuration, etc. Each variable may be given an individual weightage that accounts for its contribution to bleed emissions, and based on a sum of the individual weights, a parking location of the vehicle may be selected. The vehicle controller may include further instructions for operating a second metric on-board the vehicle that estimates the potential for cold-start exhaust emissions from the vehicle when the vehicle is started on the next drive cycle after being parked at the end of the current drive cycle. For example, the second metric may account for exhaust catalyst temperature, ambient temperature conditions, as well as an expected parking duration. If the vehicle is included a car-sharing model, the expected parking duration may be determined based on operator input such as when a customer operating the vehicle on the current drive cycle plans to drop off the vehicle, and when another customer has requested the same vehicle for the subsequent drive cycle. Metrics may be run for vehicles individually or for each vehicle of a fleet. Based on the sum of individual weights for a given vehicle, parking selections can be appropriately made. As a non-limiting example, if the ambient temperature at a final destination is elevated (e.g., higher than a threshold) for a vehicle have a higher propensity for bleed emissions, the vehicle may have a higher bleed emissions weightage and accordingly may be sent control signals commanding it to be parked in an enclosed space. In comparison, if the ambient temperature at the final destination is lower than the threshold for another vehicle, it may be commanded to be parked indoors. As another example, if a vehicle has a DTC set indicating Evap leak, the vehicle may be weighted higher and prioritized for parking in an enclosed space.

Further still, the final parking place may be selected based on an operator selection for reduced emissions. For example, upon reaching a final destination, multiple parking options may be provided to a vehicle operator including an option that provides least emissions. The parking option that provides least emissions may be selected by a vehicle controller as a function of the sum of individual weights of the plurality of variables related to an integrity of the fuel system and/or Evap system of the vehicle. For a given sum of weights, directions to a parking spot with lower solar loading may be provided when the operator selects reduced emissions (or "green" operation) while directions to another parking spot with higher solar loading may be provided when the operator selected reduced time or distance (from parking spot) to final destination. Further, the degree of solar loading may be varied based on the emissions weightage. For example, a vehicle having a higher canister load may be directed to a parking spot with a higher degree of coverage than a vehicle with a lower canister load.

The present description may provide several advantages. In particular, the approach may decrease desorption of fuel vapors from the canister to the atmosphere by leveraging the self-driving capabilities of an autonomous vehicle to not park the vehicle in the sun when bleed emissions are likely to occur. The technical effect of assessing the contribution of a plurality of vehicle fuel system and evaporative emissions system parameters in generating bleed emissions is that a more reliable and accurate estimation of bleed emissions occurrence can be generated. Based on the score, an autonomous vehicle can then be directed to an enclosed or open parking space upon reaching its final destination. By generating a score associated with bleed emissions likelihood, vehicles having a higher score, and therefore a higher propensity for bleed emissions, can be directed to parking locations having a higher degree of coverage to reduce the solar loading on them. In comparison, vehicles having a lower score, and therefore a lower propensity for bleed emissions, can be directed to open parking locations.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows a schematic depiction of temperature changes during a diurnal cycle.

DETAILED DESCRIPTION

Figure 1:
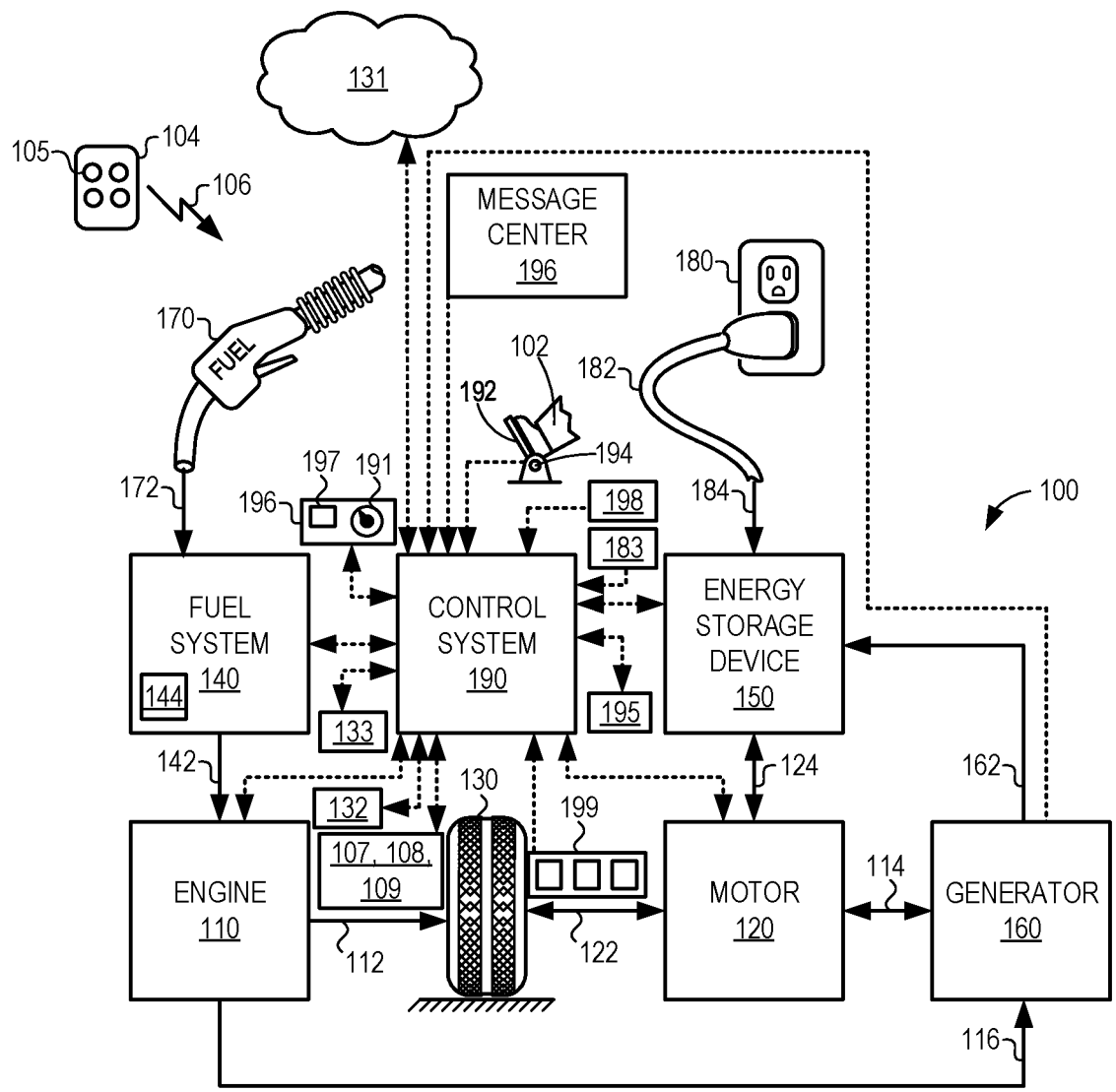
FIG. 1 shows a schematic depiction of an example hybrid vehicle system.
Figure 8:
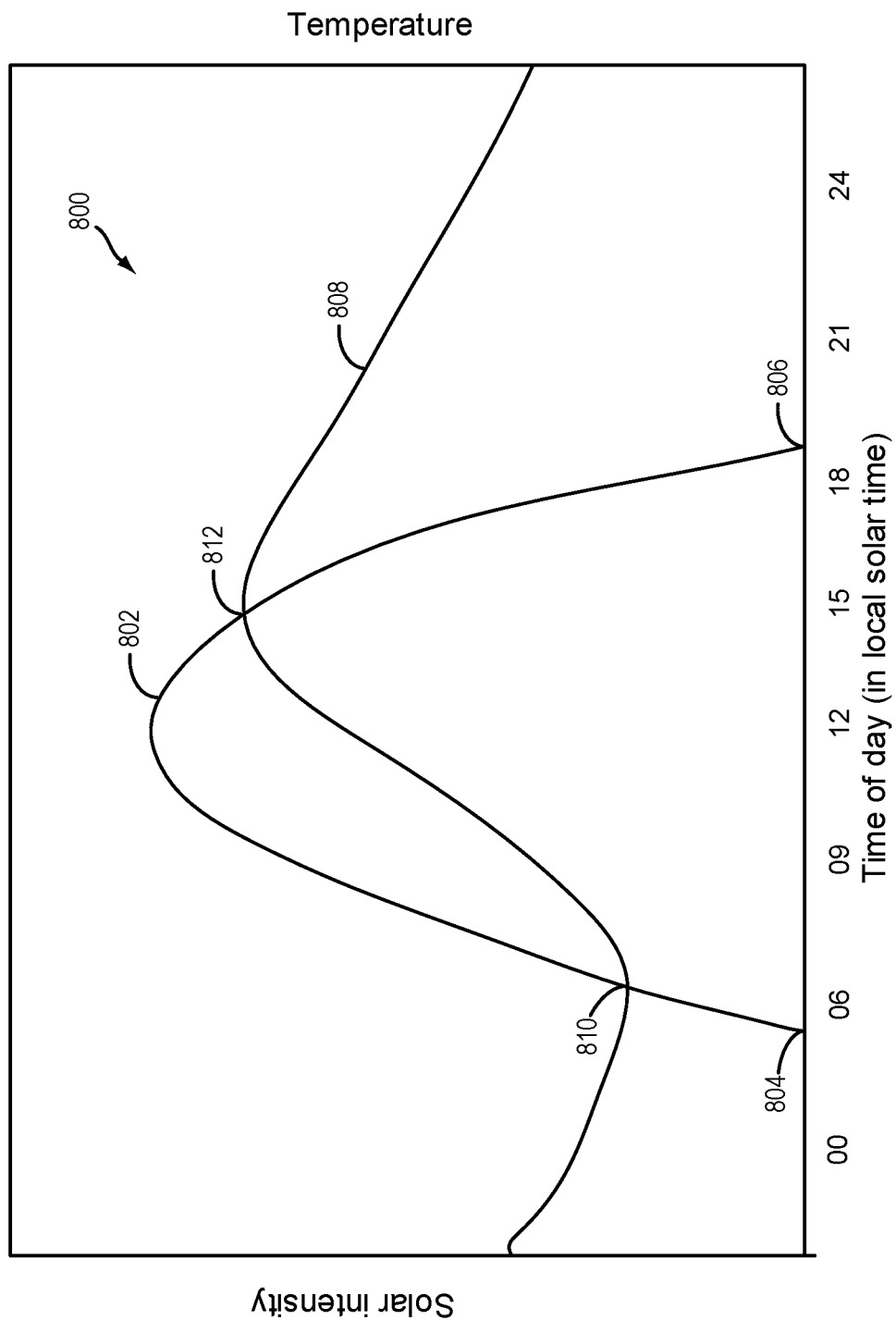
FIG. 8 shows a prophetic example of selecting distinct parking locations for different vehicles of a fleet based their individual weighted scores for bleed emissions.
Figure 9A:
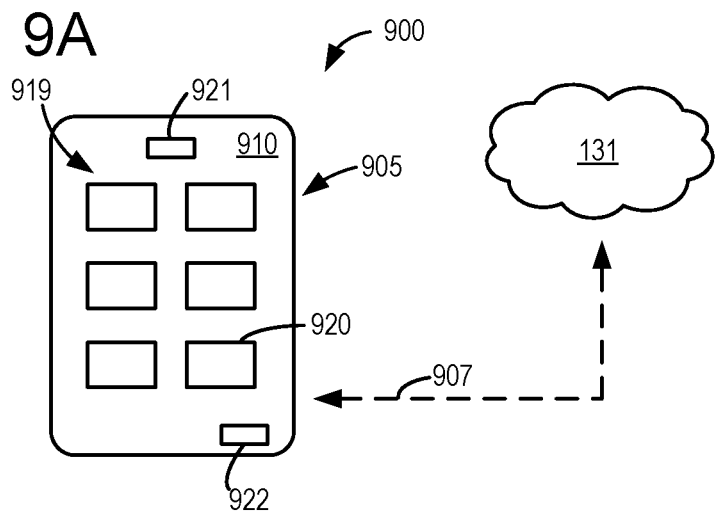
FIGS. 9A-B depict example embodiments of software applications that may enable selection of a parking location for vehicle participating in a car-sharing model.

The following description relates to systems and methods for coordinating environmentally friendly parking events for vehicles, including vehicle participating in car-sharing models. Briefly, the following description relates to systems and methods for providing directions to a parking spot selected based on the bleed emissions potential of a vehicle. The parking spot is further selected based on an operator selection of reduced emissions or "green" operation. A hybrid vehicle configured for participating in a car-sharing model and for start-stop (S/S) operation is depicted at FIG. 1. At FIG. 2, an engine system of the vehicle, including an associated evaporative emissions system, is depicted. The vehicle may be autonomously operated, thus a system for autonomously operating the vehicle is depicted at FIG. 3. A vehicle controller may be configured to execute a control routine, such as the example routine of FIG. 4, to display parking options to a vehicle user based on the selection of a "green" profile by the user, and further based on the vehicle's exhaust and bleed emissions score. The exhaust emissions score may be determined based on predicted changes in exhaust catalyst state during the upcoming parking event (FIG. 5) while a bleed emissions score (FIG. 6) may be determined based on actual and predicted changes in the state of a plurality of variables (FIG. 7) related to the vehicle's fuel and evaporative emissions system. The parking selection may vary a degree of coverage over the vehicle based on the bleed and exhaust emission score by taking account of the change in fuel system temperature and pressure achieved via solar loading of the vehicle (FIG. 8). For vehicles participating in car-sharing models, instructions for coordinating an environmentally friendly vehicle parking event, may be received at the controller of the vehicle via a software application, such as the software application depicted at FIGS. 9A-9B. An example timeline for adjusting vehicle parking operations to improve emissions is depicted at FIG. 10.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the motor 120 and generator 160 may comprise a same motor/generator.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In some examples, engine 110 may be configured with a start/stop (S/S) feature 183 (also referred to herein as a S/S system) communicatively coupled to control system 190, wherein the control system 190 may automatically shut down (idle-stop) the internal combustion engine 110 without receiving operating input to shut down the engine, if selected idle-stop conditions, or in other words a set of predetermined conditions, are met. These may include, for example, torque demand being less than a threshold engine torque, vehicle speed below a threshold vehicle speed (e.g. 5 mph), the onboard energy storage device being sufficiently charged, no request being received for air-conditioning, etc. Likewise, the engine may be automatically restarted responsive to the torque demand being higher than the threshold, the battery (e.g. onboard energy storage device) requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via a motor (e.g. 120) or electric machine coupled to a crankshaft of the engine, until a desired engine speed is reached, after which the motor or electric machine may be disabled and engine fueling may be resumed. Thereafter engine combustion may be able to support engine spinning. As a result of the automatic start/stops, fuel consumption and exhaust emissions may be reduced.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, the fuel tank in the vehicle may be depressurized so that refueling may be performed. In examples where the vehicle comprises an autonomous vehicle, refueling may be initiated under the control of control system 190, where refueling may be initiated without manual actuation of refueling button 197.

As another example, the vehicle instrument panel 196 may include a profile selection dial 191 which may be manually actuated by a vehicle operator to indicate a preference for a vehicle operation profile. For example, actuating the dial to a "green" profile may indicate a vehicle operator's preference for reducing exhaust and evaporative emissions. Accordingly, vehicle operating parameters may be adjusted to preferentially reduce emissions, even at the cost of vehicle (time-to-torque) performance. In addition, as elaborated with reference to FIG. 4, vehicle parking selections may be provided that are biased towards reducing exhaust and bleed emissions from the vehicle, when parked. As another example, actuating the dial to a "sport" profile may indicate a vehicle operator's preference for providing improved vehicle responsiveness and reduced time-to-torque. Still other profiles may be selected. In addition, each profile may have different degrees (e.g., sport levels 1-5, green levels 1-3, etc.) allowing for further customization of vehicle performance by the vehicle operator.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art. Specifically, control system 190 may be coupled to a wireless communication device (not shown at FIG. 1 but shown at reference numeral 284 of FIG. 2) for direct communication of the vehicle system 100 with wireless network 131. Using wireless communication via the wireless communication device 284 (of FIG. 2) with wireless network 131, the vehicle system 100 may in some examples retrieve data from servers regarding current and/or upcoming ambient conditions (such as ambient humidity, temperature, pressure, precipitation, wind, etc.) from wireless network 131. As will be discussed in detail below, wireless network 131 may allow for communication between the control system 190 and a software application (see FIGS. 5 and 9A-9B) that provides instructions to control system 190. Specifically with regard to the present disclosure, the software application may provide instructions to control system 190 regarding where to park vehicle system 100 in order to minimize exhaust and bleed emissions while maintaining an exhaust catalyst temperature in a target range between drive cycles.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, traffic information, etc. In one example, information received from the GPS may be utilized in conjunction with route learning methodology, such that routes commonly traveled by a vehicle may be learned by the vehicle control system 190. In some examples, other sensors 133, such as lasers, radar, sonar, acoustic sensors, etc., may be additionally or alternatively utilized in conjunction with the onboard navigation system to conduct route learning of commonly traveled routes by the vehicle. As one example, route-learning methodology may comprise information related to learned duration of stops along learned driving routines, where the engine may be stopped as a result of the S/S feature, or stopped for other reasons (e.g. between drive cycles for an autonomous vehicle participating in a car-sharing model). In some examples, such learned duration of stops where the engine may be shut down may include information acquired wirelessly via the control system (via GPS and/or internet, V2V, V2I2V, etc.) where such information may include traffic light status (e.g. how long until a particular traffic light turns green), traffic conditions that relate to how long a particular stop may last, etc. As will be discussed in detail below, such information may be used in order to select a parking location for the vehicle since each of these parameters affects the state of the vehicle's fuel system, and evaporative emissions system (e.g., affects a fuel fill level, a canister load, and an exhaust catalyst temperature relative to a light-off temperature). The parking selection may vary the solar loading on the vehicle to provide for a more environmentally friendly parking event when a green profile is selected by the operator.

Vehicle system 100 may in some examples further include sensors dedicated to indicating the occupancy-state of the vehicle, for example seat load cells 107, door sensing technology 108, and onboard cameras 109.

Figure 2:
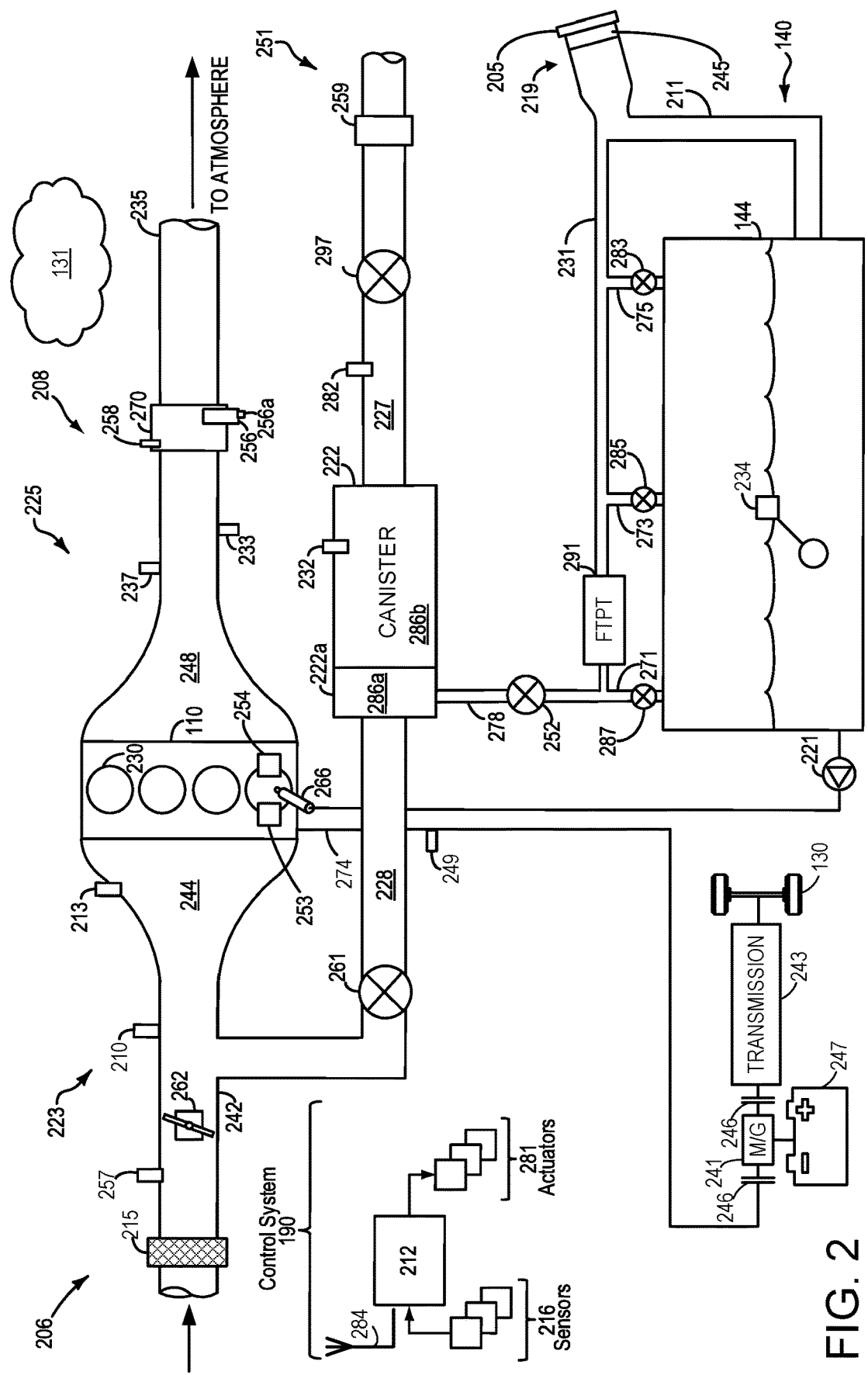
FIG. 2 shows a schematic depiction of a fuel system and evaporative emissions system coupled to an engine system.
Figure 3:
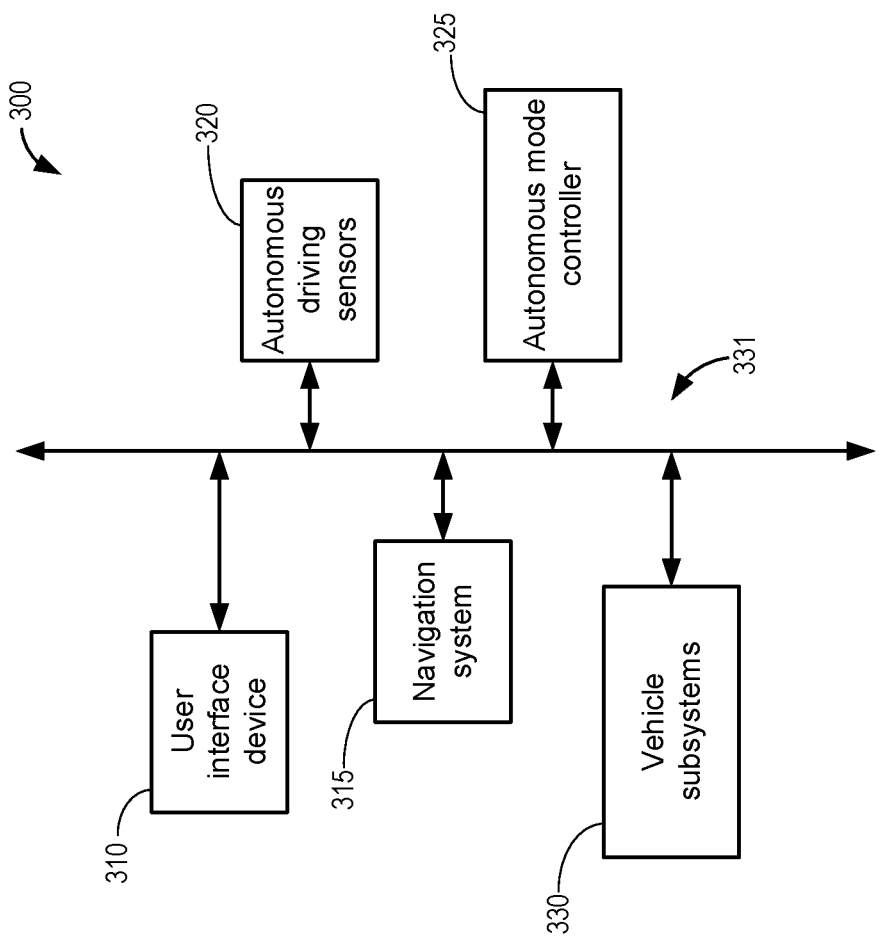
FIG. 3 schematically illustrates a block diagram of an example autonomous driving system.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 140. Emission control system 251 includes a fuel vapor container or canister 222 which may be used to capture and store fuel vapors.

The engine system 208 may include an engine 210 having a plurality of cylinders 230. While not explicitly shown, it may be understood that each cylinder may include one or more intake valve(s) and one or more exhaust valve(s). The engine 210 includes an engine air intake 223 and an engine exhaust system 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device such as a battery (e.g. device 150 of FIG. 1). Further, engine air intake 223 may include an air box having a filter 215 positioned upstream of throttle 262. The engine exhaust system 225 includes an exhaust manifold 248 leading to an exhaust passage 235 that routes exhaust gas to the atmosphere. The engine exhaust system 225 may include one or more emission control devices 270 which may be mounted in a close-coupled position in the exhaust. The one or more emission control devices may include various exhaust catalysts, such as a three-way catalyst, lean NOx trap, diesel particulate filter, oxidation catalyst, etc. In some examples, the one or more emission control devices may include an electric heater 256, the electric heater 256 configured to raise a temperature of the emission control device to a desired operating temperature (e.g. light-off temperature). The electric heater may be operated based on command signals received from controller 212. The command signals may include a signal to an electric heater actuator 256a that actuates current flow through the electric heater, thereby turning on the operation of the heater, responsive to a temperature of the catalyst falling below a threshold temperature. The command signals may further include another signal to the electric heater actuator 256a that disables current flow through the electric heater, thereby turning off the operation of the heater, responsive to the temperature of the catalyst rising above the threshold temperature. An exhaust catalyst temperature sensor 258 may be configured to indicate exhaust catalyst temperature to control system 190.

It will be appreciated that other components may be included in the engine such as a variety of valves and sensors. For example, a barometric pressure sensor 213 may be included in the engine intake passage for estimating an ambient pressure. As another example, a manifold air pressure (MAP) sensor 217 may be coupled to the engine intake downstream of throttle 262. MAP sensor 217 may rely on part throttle or full or wide open throttle conditions, e.g., when an opening amount of throttle 262 is greater than a threshold, in order accurately determine MAP. Alternatively, MAP may be inferred from alternate engine operating conditions, such as mass air flow (MAF), as measured by MAF sensor 210 coupled to the intake manifold.

Fuel system 140 may include a fuel tank 220 coupled to a fuel pump system 221. The fuel pump system 221 may include one or more pumps for pressurizing fuel delivered to the injectors of engine 210, such as the example injector 266, as shown. While only a single injector 266 is shown, additional injectors are provided for each cylinder. It will be appreciated that fuel system 140 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 140 may be routed to an evaporative emissions control system 251, which includes a fuel vapor canister 222, via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Fuel filler system 219 is coupled to fuel tank 220 via a fuel filler pipe or neck 211.

Further, fuel filler system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request (e.g., a vehicle operator initiated request), the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation, provided the fuel tank is coupled to the canister under such conditions). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 140.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 140 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 144 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 144 to fuel vapor canister 222. Fuel vapors may then be vented to atmosphere, or purged to engine intake system 223 via canister purge valve 261. As will be discussed in detail below, in some examples the FTIV may not be included, whereas in other examples, an FTIV may be included.

Fuel system 140 may be operated by controller 212 in a plurality of modes by selective adjustment of the various valves and solenoids. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 190. Control system 190 is shown receiving information from a plurality of sensors 216 (various examples of which are described herein and at FIG. 1) and sending control signals to a plurality of actuators 281 (various examples of which are described herein and at FIG. 1). As one example, sensors 216 may include exhaust gas sensor 237 located upstream of the emission control device 270, temperature sensor 233, fuel tank pressure sensor 291, pressure sensor 282, canister temperature sensor 232, MAF sensor 210, intake air temperature (IAT) sensor 257, and temperature sensor 258. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297, electric heater actuator 256a, etc. The controller may receive input data from the various sensors, process the input data, and trigger the actuators in response to the processed input data based on instruction or code programmed therein corresponding to one or more routines. Example control routines are described herein with regard to FIGS. 4-6. As an example, responsive to canister pressure sensor input indicative of a higher than threshold canister load, the controller may send command signals to provide parking instructions that enable the vehicle system to be parked at an enclosed location where the likelihood of bleed emissions from solar loading are reduced.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode, or a remote start event may trigger a return to an awake mode. In some examples, a wakeup capability may enable a circuit to wake the controller in order to conduct diagnostics on the engine system, as will be discussed in further detail below. For example, a timer may be set that enables a circuit to wake the controller upon the timer elapsing.

Undesired evaporative emissions detection routines may be intermittently performed by controller 212 on fuel system 140 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

Intake manifold 244 is coupled to combustion chambers or cylinders 230 through a series of intake valves 253. The combustion chambers are further coupled to exhaust manifold 248 via a series of exhaust valves 254. While only one intake and one exhaust valve is depicted at FIG. 2, it may be understood that each combustion chamber or cylinder may include an intake and exhaust valve. In the depicted embodiment, a single exhaust manifold 248 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft sensors (not shown) may be included in the vehicle propulsion system. Furthermore, crankshaft 274 may include crankshaft sensor 249. In some examples, one or both of crankshaft sensor 249 and/or camshaft sensors (not shown) may be utilized to infer a position of one or more pistons coupled to the engine cylinders 230.

In some examples, vehicle system 206 may be a hybrid vehicle with multiple sources of torque available to one or more vehicle wheels 130. In the example shown, vehicle system 206 includes engine 110 and an electric machine 241. Electric machine 241 may be a motor (e.g. same as 120) or a motor/generator. Crankshaft 274 of engine 110 and electric machine 241 are connected via a transmission 243 to vehicle wheels 130 when one or more clutches 246 are engaged. In the depicted example, a first clutch is provided between crankshaft 274 and electric machine 241, and a second clutch is provided between electric machine 241 and transmission 243. Controller 212 may send a signal to an actuator (not shown) of each clutch 246 to engage or disengage the clutch, so as to connect or disconnect crankshaft from electric machine 241 and the components connected thereto, and/or connect or disconnect electric machine 241 from transmission 243 and the components connected thereto. Transmission 243 may be a gearbox, a planetary gear system, or another type of transmission. The powertrain may be configured in various manners including as a parallel, a series, or a series-parallel hybrid vehicle, as discussed at FIG. 1.

Electric machine 241 receives electrical power from a traction battery 247 (e.g. same as 150) to provide torque to vehicle wheels 130. Electric machine 241 may also be operated as a generator to provide electrical power to charge traction battery 247, for example during a braking operation.

The controller 212 may be coupled to a wireless communication device 284 for direct communication of the control system 190 and vehicle system 206 with wireless network 131, as discussed above.

Furthermore, as discussed herein, the methods and systems may be applicable to autonomous vehicles. Accordingly, turning now to FIG. 3, a block diagram of an example autonomous driving system 300 that may operate, for example, the vehicle system 100, described at FIG. 1. Herein, the vehicle system 100 will be referred to simply as a "vehicle". The autonomous driving system 300, as shown, includes a user interface device 310, a navigation system 315 (which may be the same as 132), at least one autonomous driving sensor 320, an autonomous mode controller 325, and vehicle subsystems 330.

The user interface device 310 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 310 may be configured to receive user inputs. Thus, the user interface device 310 may be located in the passenger compartment (not shown) of the vehicle. In some possible approaches, the user interface device 310 may include a touch-sensitive display screen.

The navigation system 315 may be configured to determine a current location of the vehicle using, for example, a Global Positioning System (GPS) receiver configured to triangulate the position of the vehicle relative to satellites or terrestrial based transmitter towers. The navigation system 315 may be further configured to develop routes from the current location to a selected destination, as well as display a map and present driving directions to the selected destination via, for example, the user interface device 310.

The autonomous driving sensors 320 may include any number of devices configured to generate signals that help navigate the vehicle. Examples of autonomous driving sensors 320 may include a radar sensor, a lidar sensor, a vision sensor (e.g. a camera), vehicle to vehicle infrastructure networks, or the like. The autonomous driving sensors 320 may enable the vehicle to "see" the roadway and vehicle surroundings, and/or negotiate various obstacles while the vehicle 100 is operating in autonomous mode. The autonomous driving sensors 320 may be configured to output sensor signals to, for example, the autonomous mode controller 325.

The autonomous mode controller 325 may be configured to control one or more subsystems 330 while the vehicle is operating in the autonomous mode. Examples of subsystems 330 that may be controlled by the autonomous mode controller 325 may include a brake subsystem, a suspension subsystem, a steering subsystem, and a powertrain subsystem. The autonomous mode controller 325 may control any one or more of these subsystems 330 by outputting signals to control units associated with subsystems 330. In one example, the brake subsystem may comprise an anti-lock braking subsystem, configured to apply a braking force to one or more of wheels (e.g. 130). Discussed herein, applying the braking force to one or more of the vehicle wheels may be referred to as activating the brakes. To autonomously control the vehicle, the autonomous mode controller 325 may output appropriate commands to the subsystems 330. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

Autonomous vehicles are able to assume certain vehicle tasks otherwise handled by a traditional vehicle driver. For example, autonomous vehicles can navigate to a specific destination by controlling the steering, acceleration, braking, etc., by relying on sensors or other resources to detect nearby vehicles, pedestrians, and objects in or near the road. The vehicle can be controlled according to the signals output by such sensors. As discussed with reference to FIG. 4, when an autonomous vehicle reaches a final destination, there may be flexibility and opportunity to park the vehicle in a space where bleed and exhaust emissions are reduced. For example, based on the state of the vehicle's fuel system and evaporative emissions system, the vehicle can be commanded to a parking location that allows for reduced bleed emissions from solar loading on the vehicle. As another example, the vehicle can be commanded to a parking location that allows for reduced cold-start exhaust emissions by providing solar loading on the vehicle for exhaust catalyst temperature maintenance. This allows for the vehicle to be opportunistically operated in an environmentally friendly manner, or in a "green" profile.

Whether the vehicle is autonomously operated, operated via a human driver, or some combination of both (e.g., human driver under some circumstances while autonomously operated under other circumstances), the vehicle systems described above may participate in car-sharing models. Discussed herein, a car-sharing model includes a model of car rental where people rent vehicles for short periods of time. In some examples, a customer may pay for the use of such a vehicle by the hour, as a function of miles driven, etc. A customer may communicate with one or vehicles of a car-sharing fleet via an application running on a user device, such as a smart phone, the application communicatively coupled to the vehicles via a wireless network, such as network 131 of FIGS. 1-2. Such vehicles may accumulate much more mileage in a short period of time than vehicles that do not participate in car-sharing. Therefore, such vehicles are likely to have many short rest periods and thus many key-off (e.g. where the vehicle is deactivated or turned off, including the engine) and crank events per day to restart the engine. If the crank events to restart the engine occur at a time when the exhaust catalyst (e.g. 270) has cooled to a temperature below its light-off temperature, then the engine start event is expected to be less environmentally friendly (e.g. increased undesirable amounts of tailpipe emissions) than engine starts where the exhaust catalyst temperature is above the light-off temperature. Thus, a vehicle controller may opportunistically provide commands to enable the vehicle to be parked in a location that allows the exhaust catalyst temperature to be maintained (as close to a target temperature as possible) while the vehicle is parked. This may be performed by directing the vehicle to a parking location where solar loading is increased or decreased, based on various parameters including the state of the exhaust catalyst, fuel system conditions, ambient conditions, and a priori information regarding a next drive cycle of the given vehicle. This allows for the vehicle to be opportunistically operated in an environmentally friendly manner, or in a "green" profile. Similar methodology may additionally or alternatively be applied to vehicles with S/S capability.

In order to achieve such results, the systems and methods discussed herein take advantage of the fact that in car sharing models, customers schedule pickup of such vehicles ahead of time and/or that traffic information, learned driving habits, learned route information, etc., may be obtained via the controller of such vehicles. Thus, with a priori knowledge of when and where a vehicle will complete a current drive cycle, and when and where a subsequent drive cycle is likely to be initiated, parking operations of the vehicle in between the current and subsequent drive cycles can be adjusted. The parking operations may be adjusted to maintain the exhaust catalyst temperature above the light-off temperature between short rest periods where the engine is stopped from combusting air and fuel. Furthermore, the parking operations may be adjusted to reduce release of fuel vapors from the fuel system to the tailpipe (bleed emissions). Furthermore, as discussed, such methodology is not limited to vehicles participating in car-sharing models. Specifically, for vehicles equipped with the capability of route-learning methodology and/or V2V/V2I/V2I2V technology there may be opportunity to predict when the vehicle engine will be requested to be restarted, thus enabling the methodology of adjusting parking operations.

In order to implement such methodology, it may be understood that accurate knowledge of exhaust catalyst temperature, fuel system state, canister conditions (e.g., canister temperature, pressure, load, etc.), and ambient conditions (e.g., ambient temperature and pressure) may be requested in between or during drive cycles (such as towards the end of a drive cycle, when within a threshold duration or distance of a final destination).

In this way, the components of FIGS. 1-3 enable a vehicle system comprising an engine having an exhaust catalyst; a fuel system having a fuel vapor canister coupled to a fuel tank; an interface for receiving a vehicle operating profile selection from a vehicle operator; and a controller communicatively coupled to one or more vehicle operators via a network, wherein the controller is configured with computer readable instructions stored on non-transitory memory that when executed cause the controller to: at the end of a given drive cycle, select a first parking location as a function of potential for bleed emissions from the fuel system and exhaust emissions from the exhaust catalyst when a first vehicle operating profile is selected; select a second parking location as a function of distance to destination when a second vehicle operating profile is selected; and navigate the vehicle to the selected parking location. As an example, the first vehicle operating profile includes a preference for environmental friendliness, and the second vehicle operating profile includes a preference for convenience. The controller may include further instructions that cause the controller to select the first parking location when a parking duration between the given drive cycle and a subsequent drive cycle is shorter, and select the second parking location when the parking duration between the given drive cycle and the subsequent drive cycle is longer. As an example, the first parking location has a lower solar loading than the second parking location. The controller may also receive further information regarding the given drive cycle from a first vehicle operator including a first drop-off time and location, and wherein the controller receives information regarding the subsequent drive cycle from a second vehicle operator including a second pick-up time and location. Further still, the controller may include instructions to estimate the potential for bleed emissions from the fuel system based on fuel system variables including fuel tank fill level and canister load, estimate the potential for exhaust emissions based on exhaust catalyst temperature and ambient conditions, wherein each of the potential for bleed emissions and potential for exhaust emissions is further based on the information regarding the given drive cycle and the subsequent drive cycle.

Figure 4:
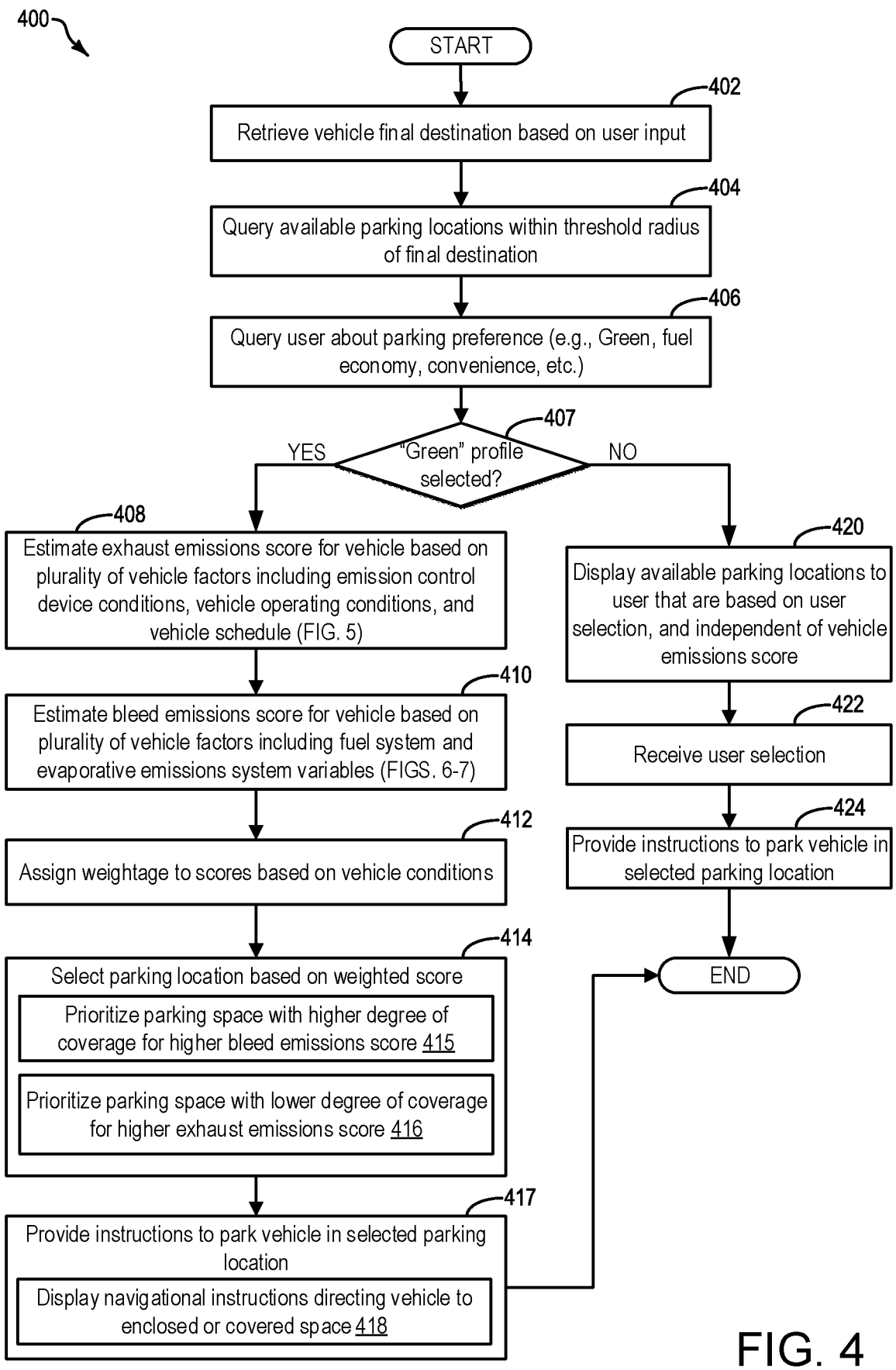
FIG. 4 shows a high level flowchart for an example method for selecting a parking location of a vehicle based on bleed emissions potential of the vehicle.

Turning now to FIG. 4, an example method 400 for selecting a parking location of a vehicle that reduces vehicle exhaust and bleed emissions is shown. The method also enables directions to be provided for navigating the vehicle, autonomously or via an operator, to the selected parking location. The method also enables the location of pick-up of a shared vehicle to be adjusted so that the vehicle can be operated in an environmentally friendly manner.

At 402, the method includes retrieving vehicle destination information based on user and/or navigational input. The vehicle destination may be retrieved while the vehicle is being navigated or driven to the final destination (e.g., during a drive cycle), or at the onset of a drive cycle, before vehicle operation is commenced. As an example, the final destination may be based on a user indicated destination provided into a vehicle's GPS system. As another example, in the case of an autonomous or car-sharing vehicle, the final destination may be based on the location and schedule of an upcoming passenger pick-up. The final destination may be retrieved as an address, or a location learned from drive history of a vehicle or vehicle operator, such as from "work", "home", "gym", and "groceries" locations. In addition to retrieving the vehicle destination, a scheduled time of reaching the destination may also be retrieved and intermittently updated, such as based on traffic and weather information.

At 404, the method includes querying parking locations available within a threshold radius of the final destination. For example, if the destination is a home, parking locations in a driveway, in a garage, and on a road within a vicinity of the home, may be identified. As another example, if the destination is a business (e.g., office or store), parking locations on roads near the business, as well as carports and parking garages within a vicinity of the business may be identified. For each parking location identified, the controller may also learn a degree of coverage associated with the location. As an example, for a location that is on a road with no trees, the degree of coverage may be indicated to be 0%. As another example, for a location that is inside a parking garage, the degree of coverage may be indicated to be 100%. As yet another example, for a location that is on a road with trees, the degree of coverage may be a value between 0 and 100% based on an amount of foliage on the tree.

At 406, the method includes querying the user (or vehicle operator) about parking preferences. For example, the user may be asked, such as via an interactive message in a vehicle display, if they wish to provide a parking preference, such as a preference for a "green" parking option (which provides the lowest emissions while parked), a fuel economy biased parking option (which uses the least amount of fuel to get to the location), a convenience parking option (which provides the least distance between the parking location and the final destination). Still other selections may be possible. In still a further example, the query may include retrieving a final position of a profile selector (e.g., dial 191 of FIG. 1), as selected by the vehicle operator. Further still, the selection may be based on a default preference indicated by the user, or learned based on driver history.

At 407, it may be determined if a "green" profile was selected. For example, it may be determined if the selector dial was rotated to a "green" profile setting. Alternatively, it may be determined if a green profile is a default setting or preference of the current vehicle operator. If not, then at 420, all the available parking locations (that were retrieved at 404) may be displayed to the user. The options may be displayed in a format based on driver indicated preferences, such as in order of increasing distance. At 422, a user selection may be received. For example, the user may select one of the parking locations via interaction with a touch display. At 424, navigational instructions to the user selected parking location may be displayed so that the operator can navigate the vehicle to the selected location. In alternate examples, such as where the vehicle is a car-sharing vehicle, or an autonomous vehicle, the parking location may be predetermined based on the next customer pick-up.

Returning to 406, if the "green" profile is selected, then at 408, the method includes calculating an exhaust emissions score for the vehicle based on a plurality of vehicle factors including emission control device conditions (e.g., catalyst temperature), vehicle operating conditions (e.g., ambient temperature), and vehicle schedule (e.g., time until next pick-up or next key-on event after current key-off event). As elaborated at FIG. 5, the controller may determine an emissions score based on a plurality variables, the score being indicative of a likelihood of the exhaust catalyst falling below a light-off temperature while the vehicle is parked at the end of the current drive cycle until the next key-on event. As the likelihood of a temperature drop increases, such as due to the vehicle remaining keyed off for a prolonged duration, or due to a drop in ambient temperature (such as due to a weather change, a time of day when solar radiation is lower, etc.), the likelihood of an engine cold-start at the next key-on event increases, which could result in cold-start exhaust emissions. The higher likelihood of exhaust emissions is represented by a higher exhaust emissions score.

Next, at 410, the method includes calculating a bleed emissions score for the vehicle based on a plurality of vehicle factors including fuel system and evaporative emissions system variables (e.g., canister load, fuel tank fill level, etc.). As elaborated at FIGS. 6-7, the controller may determine an emissions score based on a plurality variables, the score being indicative of a likelihood of fuel vapors being emitted from the fuel canister while the vehicle is parked at the end of the current drive cycle until the next key-on event. The likelihood of bleed emissions while the vehicle is parked increases as the canister load or fuel tank fill level increases. The higher likelihood of bleed emissions is represented by a higher bleed emissions score.

At 412, a weightage may be assigned to each score based on vehicle conditions. For example, at higher ambient temperatures, canister load and fuel tank fill level may be weighted higher while catalyst activation level may be weighted lower. As another example, scores may be weighted based on the presence and nature of any diagnostic codes that may be set. Example weightages are shown at the table of FIG. 7.

At 414, the method includes selecting, via the controller, a parking location based on the weighted score. The parking location may be selected to reduce bleed emissions as the bleed emissions score increases (e.g., exceeds a threshold). As another example, the parking location may be selected to reduce exhaust emissions as the exhaust emissions score increases (e.g., exceeds a threshold). As a non-limiting example, at 415, the controller may prioritize a parking space with a higher degree of coverage for a vehicle having a higher bleed emissions score. As another example, at 416, the controller may prioritize a parking space with a lower degree of coverage for a vehicle having a higher exhaust emissions score. Further examples are provided below.

It will be appreciated that in some example embodiments, the parking location may be automatically selected, without requiring additional input from a vehicle operator, so as to opportunistically maximize "green" benefits, by providing a parking location where bleed emissions are reduced by the largest amount, even if such a location is not the closest or most convenient to the final destination. In this way, the operator is able to execute an environmentally friendly selection. However, in other example embodiments, a plurality of environmentally friendly parking locations, ranked in order of "green-ness" or distance from final destination, may be displayed to the vehicle operator and a final parking location is selected by the operator (or vehicle occupant).

At 417, the method includes providing instructions to park the vehicle at the selected parking location. This may include, for example at 418, providing turn by turn navigational instructions to the vehicle operator (if the vehicle is being operated by a human) to direct the vehicle to an enclosed or covered space, if such a space were selected. The method then ends.

It will be appreciated that in some examples, the final score determined at 412 may be further adjusted based on a time of day at which the vehicle is to be parked as this may affect the amount of solar loading that will occur on the vehicle. Further still, the score may be adjusted as a function of the weather, such as the presence of clouds, rain, snow, etc. By selecting a location for parking the vehicle based on the weighted score, the effect of solar loading on the vehicle's fuel system can be used to reduce emissions including bleed emissions and cold-start emissions.

Turning to FIG. 8, an example illustration of a diurnal cycle 800 as a graph of solar intensity and temperature as a function of the time of day, is shown. The graph allows solar loading on a vehicle to be determined. Incoming solar radiation 802 begins increasing at sunrise 804, and rises to a maximum near mid-day before declining until sunset 806. Thus mid-day marks a time of day near where solar loading on a vehicle parked in an open location is greatest. Accordingly, ambient temperature 808 is shown, illustrating the increase in temperature from a minimum temperature 810 near sunrise 804, to a maximum temperature 812 at midday, and a subsequent decrease in temperature from the maximum temperature 812 near sunset 806.

The solar loading on a vehicle can be reduced by situating the vehicle in a location where there is enclosure or coverage, such as shade from a tree or carport (lower degree of coverage), or in a parking garage (higher degree of coverage). Accordingly, if a drive cycle is expected to be completed, and the vehicle is to be parked, at a time of the day when the solar loading is highest (at mid-day), the parking location may be adjusted based on likelihood of bleed emissions. If bleed emissions are anticipated, the vehicle can be navigated to a parking location where the solar loading is lower. Alternatively, the vehicle can be navigated to a parking location where the solar loading is higher to allow an exhaust catalyst temperature to be maintained warm, thereby reducing cold-start exhaust emissions on a subsequent drive cycle of the vehicle.

Figure 6:
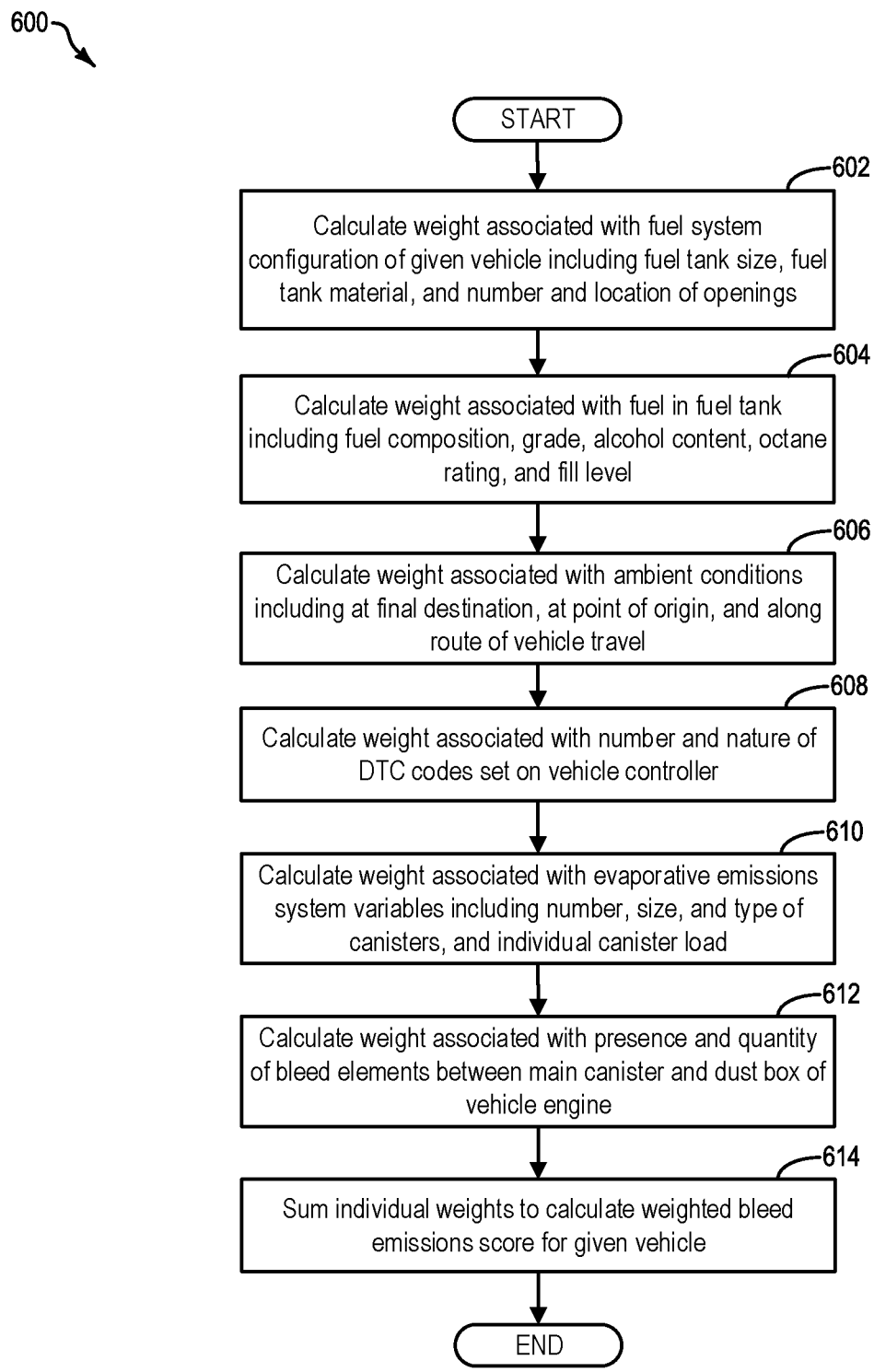
FIG. 6 shows an example list of variables that may affect a vehicle's bleed emissions, and their corresponding weightage.

Turning now to FIG. 6, an example method is shown for estimating a bleed emissions score for a vehicle. Method 600 may take into account a plurality of fuel system and evaporative emissions system variables, including but not limited to the examples listed at FIG. 7. Method 600 may be performed as part of the method of FIG. 4, such as at 410. Variation in the individual weightage ascribed to a given variable is shown by way of a table at FIG. 7.

At 602, the method includes calculating a (first) weight associated with the fuel system configuration of the given vehicle. This includes various hardware related parameters such as fuel tank size or capacity, the material with which the fuel tank is made, as well as the number and location of openings on the fuel tank. As shown at table 700 of FIG. 7, a smaller sized fuel tank is ascribed a higher weightage than a larger sized fuel tank. A smaller sized fuel tank may have a smaller ullage space. Thus, for a given amount of fuel in a fuel tank, the smaller sized tank is able to hold a smaller amount of fuel vapors in the ullage space, increasing the potential for bleed emissions. As also shown at table 700 of FIG. 7, a fuel tank having a shell made of a non-metal, such as plastic (or other more easily deformable material) is ascribed a higher weightage than a metal shell (or other less easily deformable material) fuel tank. For a given fuel tank size, the fuel tank shell made of stronger material is able to retain a larger amount of fuel vapors and thereby resist a higher fuel tank pressure. The non-metal fuel tank therefore has a higher potential for bleed emissions. As further shown at table 700, a fuel tank having multiple openings may have a higher potential for bleed emissions, such as in the case of a fuel tank design having multiple GVVs and FLVVs in a fuel tank upper shell. A fuel tank having a single opening, such as a single flange with GVVs and FLVVs internally integrated into the fuel tank, may have less hydrocarbon permeation out of the fuel tank. However, they may require a more complicated manufacturing process. On the other hand, fuel tanks with multiple fuel tank vent valves, such as 2 GVVs and 1 FLVV mounted externally on the top of the fuel tank outer shell, may have a higher permeation amount, and therefore a higher likelihood of bleed emissions. However, the manufacturing and welding of the fuel tank may be easier. Still other fuel system variables associated with fuel system hardware may be accounted for and a higher weightage may be ascribed to configurations that increase the potential for bleed emissions.

Returning to FIG. 6, at 604, the method includes calculating a (second) weight associated with fuel in the fuel tank including, but not limited to, fuel composition, fuel grade (e.g., seasonal variation grade or Reid Vapor Pressure, RVP), fuel alcohol content, fuel octane rating, and fill level of fuel in the fuel tank. As shown at table 700, a vehicle operating with a fuel having a higher alcohol content, octane rating, or RVP is ascribed a higher weightage than a corresponding fuel having a lower alcohol content, octane rating, or RVP due to higher potential for bleed emissions. As another example, a fuel tank having a higher fill level is ascribed a higher score than one with a lower fill level as the fuel tank with the higher fill level not only has less ullage space for retaining fuel vapors, but at a given ambient temperature or fuel system temperature, the higher quantity of fuel can also give rise to more fuel vapors. Still other fuel system variables associated with the fuel may be accounted for and a higher weightage may be ascribed to configurations that increase the potential for bleed emissions.

At 606, the method includes calculating a (third) weight associated with ambient conditions including but not limited to ambient temperature and pressure conditions at the scheduled final destination, at the point of origin of the current drive cycle, as well as all along the route of vehicle travel. Furthermore, a time of day at which the final destination is expected to be reached may also be accounted for. As indicated at FIG. 7, a vehicle that is being driven to a final destination having a higher ambient temperature, or reaching the final destination at mid-day, is ascribed a higher score due to the higher solar loading on the vehicle's fuel system increasing the propensity for bleed emissions from a fuel system. As another example, when the final destination has a higher altitude, and therefore a lower barometric pressure, a higher bleed emissions score is ascribed due to the higher propensity for fuel vapor formation at higher altitudes.

At 608, the method includes calculating a (fourth) weight associated with a number and nature of diagnostic (DTC) codes that have been set and stored in the memory of the vehicle controller. For example, it may be determined if there are any DTC codes set pertaining to a leaking fuel system valve, such as the FTIV coupling between the canister and the fuel tank. As indicated at FIG. 7, a vehicle with a leaking FTIV is ascribed a higher score. This is because the FTIV seals fuel vapor from the canister. If the FTIV leaks, then fuel vapors can overwhelm the smaller Evap canister, increasing the propensity for bleed emissions. As another example, as the number of fuel system and evaporative emissions system DTC codes that are set increases, the emissions score may be raised. Example DTC codes that may raise the bleed emissions score include, in addition to a leaky or degraded FTIV, a stuck closed canister purge valve, a degraded vapor blocking valve, a restricted EVAP fresh air port, an EVAP system leak, and a degraded canister (such as due to damage from water or dust). Example DTC codes that do not raise the bleed emissions score include DTCs not related to the evaporative emissions system or the fuel system.

At 610, the method includes calculating a (fifth) weight associated with evaporative emissions system variable for the given vehicle. This includes various hardware related parameters such as fuel vapor canister size or capacity, the number of canisters included in the system and their relative positioning (e.g., in series, in parallel, presence or absence of buffer regions in the canisters, etc.), the type of material used in the canisters, the nature or configuration of the canisters (e.g., presence or absence of bleed canisters or AIS canisters), and individual canister load. As shown at table 700 of FIG. 7, a smaller sized canister is ascribed a higher weightage than a larger sized canister due to its ability to hold a smaller amount of fuel vapors, increasing the potential for bleed emissions. Likewise, a canister having a higher load is ascribed a higher weightage as it is able to accept a smaller amount of additional fuel vapors before bleed emissions might occur.

At 612, the method includes calculating a (sixth) weight associated with the presence, number, and size of bleed elements located between the main canister and a dust box of the vehicle engine. As shown at table 700, a system having an additional bleed canister coupled to the engine air intake system may enable at least some bleed emissions released from the main canister to be trapped, thereby lowering the potential for bleed emissions, and thereby resulting in a lower emissions score.

Still other weights may be calculated in addition to those listed above. For example, weight may be calculated based on region-specific (e.g., country-specific, state-specific, etc.) emissions thresholds. As the emissions thresholds get lower and more stringent, the weightage is increased and a higher emissions score may be ascribed. Still other factors include an engine run time prior to a key-off event at which the vehicle will be parked, an engine off time after the parking event and a duration elapsed until a subsequent key-on event.

At 614, individual weights and scores may be combined (e.g., summed) to calculate a weighted emissions score for the given vehicle. The controller may rely on a look-up table, software, or algorithm to calculate a final emissions score as:

Total score=$x1$*Evap system leak size+$x2$*Canister loading+$x3$*FTIV leak size+$x4$*Fuel RVP+ $x5$*Evap leak location+$x6$*engine run time prior to key-off.

The weightage of still additional factors may be summed in this manner. A controller may then select a parking location for the given vehicle based on the total score, as discussed at FIG. 4.

Figure 5:
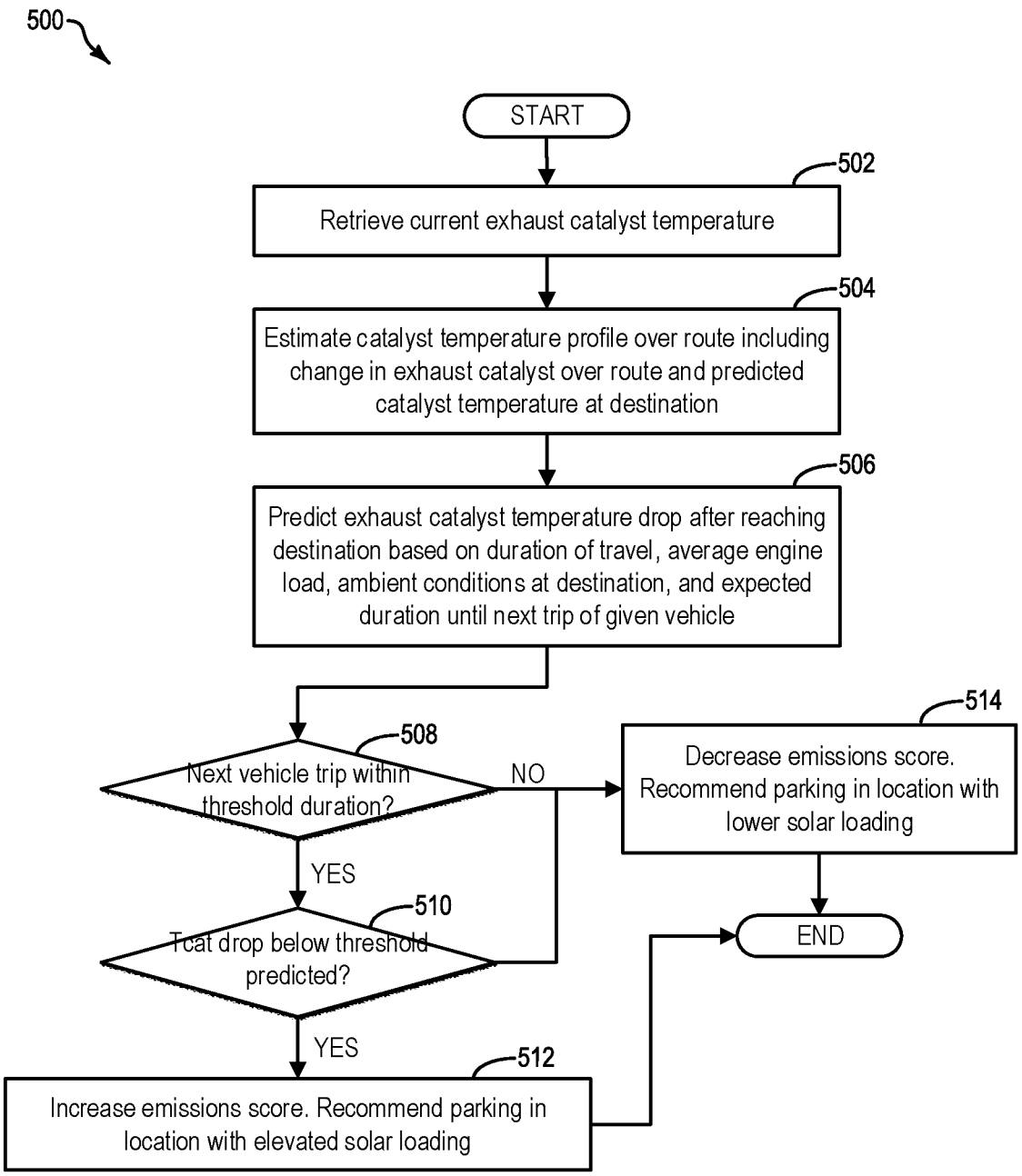
FIG. 5 shows a high level flowchart for an example method for determining a score representative of a bleed emissions potential of the vehicle.

Turning now to FIG. 5, an example method is shown for estimating an exhaust emissions score for a vehicle. Method 500 may take into account a plurality of emissions control device variables. Method 500 may be performed as part of the method of FIG. 4, such as at 408.

At 502, the method includes retrieving a current exhaust catalyst temperature, for example, via a temperature sensor coupled to an emission control device, or an exhaust passage. Alternatively, the current exhaust catalyst temperature may be inferred based on current engine operating conditions including engine speed and load. In one example, the current temperature is an exhaust catalyst temperature captured at a start of a vehicle drive cycle, such as within a threshold time or threshold distance of travel since an engine start. In another example, the current temperature is an exhaust catalyst temperature captured at a time of starting the engine at the start of the vehicle drive cycle.

At 504, the method includes estimating a catalyst temperature profile over the remainder of the route of the current vehicle drive cycle including estimating a change in catalyst temperature over the route, and a predicted catalyst temperature when the vehicle reaches the destination. For example, based on route conditions including route grade, traffic, weather, etc., change in the catalyst temperature over the remainder of the route may be predicted. In one example, if an upgrade is expected along the route, there may be an increase in engine speed and load when travelling through the upgrade, and a corresponding increase in exhaust catalyst temperature due to the increased load. As another example, if a downgrade is expected along the route, the vehicle operator may be expected to coast the vehicle while taking their foot off the accelerator pedal. The coasting may result in a decrease in engine speed and load when travelling down the grade, and a corresponding decrease in exhaust catalyst temperature due to load reduction and flow of additional air through under-hood components during the coasting. Similarly, increase in exhaust catalyst temperature may be predicted in the case of frequent stop-and-go city driving if there is increased traffic, while a decrease may be predicted if there is precipitation (e.g., rain or snow) due to a drop in ambient temperature. Based on navigational input from a vehicle GPS or other navigational device, the navigational input including a planned route from the vehicle's point of origin to the final destination, traffic weather conditions along the planned route, and presence of any detours, etc., the controller may predict or anticipate changes in exhaust catalyst temperature over the route, generating a predicted temperature profile over the route. Further still, ambient conditions at the point of origin and final destination may be accounted for. The predicted temperature profile may anticipate a different (e.g., higher or lower) temperature of the exhaust catalyst upon reaching the final destination, when the vehicle is shut down at the end of the drive cycle, relative to the (current) exhaust catalyst temperature captured at a start of the drive cycle.

At 506, the method includes the controller predicting an exhaust catalyst temperature change (e.g., drop) while the vehicle is parked, at the completion of the current drive cycle. The predicting may be based on the duration of travel prior to the vehicle stop event, average engine load over the drive cycle, ambient conditions at the destination, and an expected duration until the next trip of the given vehicle. For example, if the ambient conditions at the destination include a lower ambient temperature or presence of precipitation, a faster drop in catalyst temperature is predicted. In comparison, if the ambient conditions at the destination include a higher ambient temperature or reduced presence of cloud cover, a slower drop in catalyst temperature, or even a rise in catalyst temperature may be predicted. Similarly, if the average engine load over the drive cycle before the parking event is higher, the catalyst temperature may remain warmer for a longer duration of the parking event, as the larger amount of heat dissipates slowly.

In one example, where the vehicle is configured for car-sharing, information regarding the drop-off time and location of the current vehicle operator/occupant may be compared to the pick-up time and location of the next vehicle operator/occupant of the same vehicle (that is, the next customer to use the same vehicle) to determine a duration over which the vehicle will need to be parked. If the vehicle is expected to be picked up by another customer soon after the vehicle is dropped off at a parking location by a current customer, then there may not be enough time for an exhaust catalyst temperature to drop, and it may remain warm. Alternatively, if the vehicle is not expected to be picked up by another customer soon after the vehicle is dropped off at the parking location by a current customer, then the exhaust catalyst temperature may drop.

Irrespective of the reason, if the exhaust catalyst temperature drops sufficiently while the vehicle is parked (such as to below a light-off temperature), the catalyst may be cold and inactive at the time of the next vehicle drive cycle, resulting in cold start exhaust emissions. As elaborated below, a vehicle controller may select a parking location of the vehicle to enable better maintenance of catalyst temperature while the vehicle is parked by accounting for catalyst temperature changes over the current drive cycle as well as predicted temperature changes over the duration of vehicle parking.

At 508, the method includes determining if the next vehicle trip is expected to occur within a threshold duration of completion of the current vehicle trip. In other words, an expected duration of vehicle parking is estimated. The threshold duration may be a non-zero duration after which the temperature of the exhaust catalyst is expected to fall below the light-off temperature. In one example, the threshold duration is a duration that maintains exhaust temperature in the catalyst light-off region of between 400 to 600° C. In one example, the controller may be communicatively coupled to multiple vehicle operators via a software application running on a personal device of the operators, the application indicating a request to pick-up the vehicle as well as details regarding the desired pick-up and drop-off location and times. Details regarding the software application are detailed at FIGS. 9A-B.

If the next vehicle trip is not expected to occur within the threshold duration, such as when the vehicle is expected to remain unused and parked for longer than the threshold duration, the method moves to 514 wherein an exhaust emissions score of the vehicle is lowered. Herein, cooling of the catalyst is expected while the vehicle is parked. Further, it may be determined that the duration is too long for catalyst temperature maintenance to be opportunistically provided via adjustments to a parking location. In view of the lower emissions score, the controller may recommend one or more parking locations to the vehicle operator at the end of the current drive cycle that provide lower solar loading since increased solar loading is not expected to have a significant effect on the catalyst temperature. This may also include recommending parking locations independent of solar loading at the locations (e.g., solar loading could be high or low). Further, this may include recommending parking locations based on predefined (default) operator preferences such as a location closest to the final destination of the current drive cycle, or closest to the pick-up location of the next drive cycle. As an example, a location in an enclosed parking garage close to the destination may be recommended. Upon selection by the operator, navigational instructions to the selected location may then be provided.

If the next vehicle trip is within the threshold duration, then at 510, it may be determined if the catalyst temperature is expected to fall below a threshold temperature, such as a light-off temperature, over the duration of parking. In one example, catalyst cooling below the light-off temperature may occur in a short duration due to cooler ambient conditions as well as due to a lower average engine load on the drive cycle that was completed prior to parking the vehicle. If a temperature drop is not expected, then the method moves to 514 to lower the emissions score. The lower score indicates that parking does not be adjusted taking catalyst temperature into account. Thus, parking locations can be recommended that have lower solar loading, or are independent of solar loading (e.g., solar loading could be high or low). Further, parking locations may be recommended based on predefined (default) operator preferences such as a location closest to the final destination of the current drive cycle, or closest to the pick-up location of the next drive cycle. As an example, a location in an enclosed parking garage close to the destination may be recommended. Upon selection by the operator, navigational instructions to the selected location may then be provided.

If the next vehicle trip is within the threshold duration and the temperature of the catalyst is expected to drop in that time, then at 512, the method includes increasing the emissions score so that parking locations can be recommended that allow the catalyst temperature to be maintained opportunistically. In particular, parking locations may be recommended that have higher solar loading so that the underhood temperature, and thereby the catalyst temperature, can be raised. In one example, based on the predicted catalyst temperature drop relative to the threshold (or light-off temperature), a degree of solar loading may be varied. For example, if the catalyst temperature is predicted to drop below the threshold temperature, a location with a higher solar loading (e.g., full solar loading and no shade) may be recommended. As another example, if the catalyst temperature is predicted to remain at or just below the threshold temperature, a location with partial solar loading may be recommended, such as under a tree or a carport location. Herein, the location with the elevated solar loading may be recommended even if it does not meet the default criteria of being the closest to the final destination.

In this way, by recommending a parking location for a vehicle that leverages the temperature effect of solar loading on an exhaust catalyst, cold start exhaust emissions may be reduced.

As discussed above, coordinating location and time of vehicle pickup may be via a software application stored on a computing device such as a computer, laptop, smartphone, tablet, etc. Accordingly, turning to FIGS. 9A-9B, such a software application will be described. At FIG. 9A, illustration 900 comprises a computing device 905. In this example illustration 900, computing device 905 may be understood to comprise a smartphone communicably coupled 907 (e.g. via wireless communication) with wireless network 131 and the internet. Computing device 905 may include a display 910, and any number of software applications 915 (depicted as rectangular boxes) for use in conjunction with computing device 905. Computing device 905 may store instructions in non-transitory memory 922. At FIG. 9A, the software application for coordinating vehicle pickup time for vehicles participating in car-sharing models, is depicted as software application 920. A customer may select software application 920, which may then be used to coordinate scheduling of a time and location for vehicle pickup. For example, a customer may select software application 920 by touching a finger to the icon for software application 920. In such an example, display 910 may be understood to comprise a touchscreen. In other examples (e.g. laptop, computer, etc.), a computer mouse may be used to select software application 920. In some examples, computing device 905 may include a camera 921.

Figure 9B:
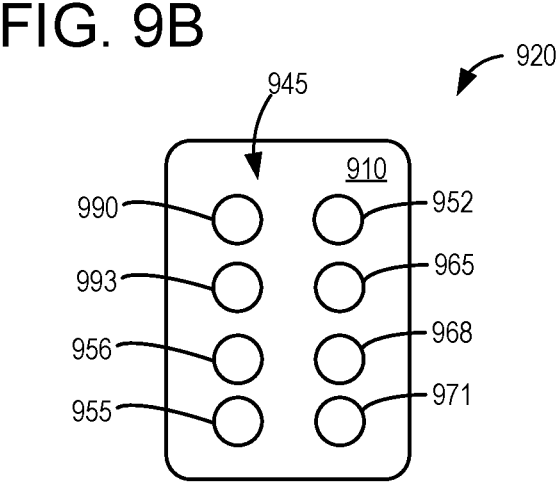
Figure 10:
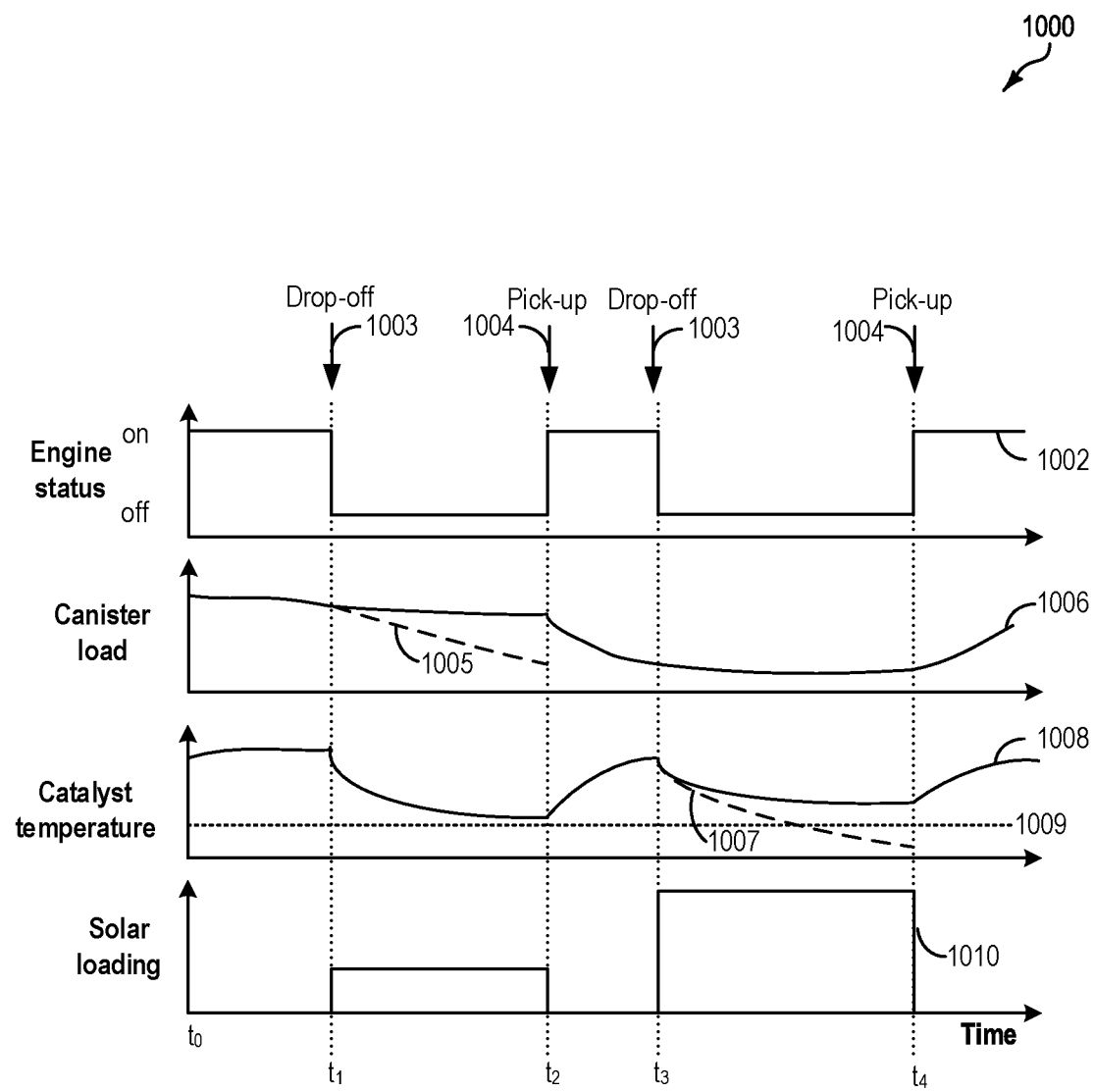
FIG. 10 shows a prophetic example of a parking event.

Accordingly, turning to FIG. 9B, another illustration is depicted, showing further selection options 945 (depicted as circles) within the framework of software application 920. It may be understood that each selection option may result in a new screen being displayed on display screen 910, with further selection options. Without depicting each and every screen display and each and every selection option at each particular screen display, the general concepts of selection options 945 within the framework of software application 920 will be discussed below.

Selection option 950 may include information pertaining to make/model of vehicle the customer desires to pick up, and selection option 953 may include a desired pickup location. The software application 920 may be in electronic communication with any number of vehicles participating in the car-sharing model. Based on the desired pickup location, the software application may present to the user a number of different options for vehicle make/model. In some examples the desired pickup location may comprise a very specific pickup location, such as a particular street between two specific cross-streets, a physical address, a location identifiable via GPS coordinates, etc. In other examples, the desired pickup location may comprise a general vicinity, for example any vehicle within a particular radius of a specific location.

Selection option 956 may include options for selecting desired pickup time/date. For example, the vehicle customer may select to pick up the vehicle at 5:00 p.m. on Tuesday, July 15$^{th}$ of a particular year. In some examples the application 920 may enable a customer to save particular selection options so that they may regularly retrieve a vehicle without having to use the application to reserve a vehicle each and every time. For example, a customer may select to pick up a desired make/model of vehicle at a particular location every Tuesday morning at 7:00 a.m.

Selection option 959 may provide the customer with the ability to provide information to the application as to the desired destination. In the case of an autonomous vehicle, such information may enable the controller of the vehicle to navigate to the particular desired destination upon being picked up by the vehicle customer. In the case where the vehicle does not comprise an autonomous vehicle, but rather comprises a vehicle participating in the car-sharing model where the vehicle is driven by the customer, the desired destination may be utilized via the software application to coordinate future scheduling events for the particular vehicle. For example, if the vehicle is to be picked up at a particular time at a particular location and then driven to the desired destination, the software application may be able to infer approximate time that the vehicle is expected to arrive at the desired destination, thus enabling the coordination/scheduling of future pickup events. For example, the software application may in some examples communicate with the controller of the vehicle after the vehicle is picked up, to determine route traveled via the vehicle (e.g. based on GPS), current traffic information, etc. In one example, current traffic information may be obtained by the vehicle controller via V2V/V2I/V2I2V communications, and such information may be relayed to the software application 920. In another example, current traffic information may be obtained via the software application obtaining such information from one or more internet web sites, etc. In some examples, upon picking up the vehicle, the customer may use the vehicle instrument panel (e.g. 196 of FIG. 1) and/or onboard navigation system (e.g., 132 of FIG. 1) to input a desired route to reach the desired destination, which may be communicated to the software application 920 in order to enable the software application to infer approximate time that the vehicle will reach its desired destination.

Selection option 962 may provide the customer with the ability to input the number of passengers for a particular vehicle pickup event in addition to the particular customer reserving the vehicle. For example, a particular customer may have a wife and two children, and may desire for the entire family to pick up a particular vehicle at a particular location and time/date in order to arrive at a particular destination. Such information may be utilized via the software application for scheduling purposes.

Selection option 965 may provide the customer with a means/method for payment. For example, at selection option 965, the customer may input one or more of credit card information, bank information, etc., in order to pay for the car-sharing service. Selection option 965 may include the ability to select dates for payments to post to the relevant account, options to save stored credit card/bank information for future transactions, etc.

Selection option 968 may provide access to/means for inputting information pertaining to the particular customer's account such as personal information (e.g. home address, full name, phone number, place of employment), user preferences, login/logout options, username options, etc.

Selection option 971 may include an option for the customer to choose an environmentally friendly mode of participating in the car-sharing model. Specifically, by choosing the environmentally friendly mode, the customer may agree to picking up and dropping off vehicles at a location where bleed emissions and exhaust emissions are lowest. This may include picking up from or dropping off at a location where there is higher solar loading so that the exhaust catalyst temperature is maintained greater than the light-off temperature at the time of pickup whenever possible. Alternatively, this may include picking up from or dropping off at a location where there is lower solar loading so that the canister emissions are lowest at the time of pickup whenever possible. In the event that no such vehicles are within a desired vicinity (e.g. desired pickup location, as discussed above), then the customer may be paired with a vehicle for the emissions score is lowest. In some examples where the customer cannot be paired with a vehicle within the desired vicinity, the customer may be provided with an option of being paired with a vehicle outside of the desired vicinity (e.g. within another threshold radius of say, 0.25 miles or less, 0.5 miles or less, 1 mile or less, 1.5 miles or less outside of the desired vicinity, etc.) such that the vehicle paired with the customer for a particular pickup event comprises a vehicle for which exhaust catalyst temperature is above the light-off temperature at the time of scheduled pickup and/or canister bleed emissions are lowest. In some examples, the environmentally friendly mode may comprise a default mode of operation of the software application. In other examples, the environmentally friendly mode selection may override a default mode where distance to destination is smallest.

Thus, it may be understood that a customer may utilize the software application depicted at FIGS. 9A-5B in order to schedule pickup of a particular vehicle at a desired location and time/date. The software application may in turn process requests from any number of customers, in order to fulfill the requests by pairing customers with vehicles available for pickup at the desired location and desired time/date. In processing the requests, the software application may further acquire information from the controllers of vehicles participating in the car-sharing model and determined to be at or within the vicinity of the desired location around the scheduled pickup time. Such information may include information related to exhaust catalyst temperature (e.g. when exhaust catalyst temperature is predicted to drop below light-off temperature), canister bleed emissions (e.g., whether bleed emissions are likely to occur based on canister load and fuel system configuration) such that customers may be paired with vehicles for which exhaust and bleed emissions are lowest at the time of vehicle pickup and drop-off.

It may be understood that there may be instructions stored at the controller (e.g. 212 of FIG. 2) of vehicles participating in a car-sharing model as described above, where such instructions may include instructions to maintain exhaust catalyst temperature above light-off temperature provided that a vehicle pickup event is scheduled within a threshold amount of time from a key-off event. In other words, the software application described above with regard to FIGS. 9A-9B may send scheduling information to particular vehicles participating in the car-sharing model, which may be received at the controller of a particular vehicles, whereupon if the scheduled pickup time is within the threshold amount of time since a key-off event, exhaust catalyst temperature may be maintained above light-off temperature until the pickup event. The threshold amount of time may comprise 2 hours for example, however the threshold amount of time may be greater than 2 hours, or less than 2 hours, without departing from the scope of this disclosure. The threshold amount of time may comprise an amount of time where it may not be efficient for fuel economy and/or emissions reasons to maintain exhaust catalyst temperature above the light-off temperature, if the scheduled or otherwise inferred subsequent request for engine restart is greater than the threshold amount of time. In other words, if the scheduled pickup time (or otherwise inferred subsequent engine restart event) is greater than the threshold amount of time after a key-off event, there may not be a substantial benefit in terms of fuel economy and/or emissions to maintaining exhaust catalyst temperature above light-off temperature for the duration of the key-off event, as compared to a cold-start of the engine at the scheduled pickup time.

The software application depicted at FIGS. 9A-5B may in some examples be updated based on information received from one or more customers. As one example, a customer may have scheduled a vehicle pickup for a particular time, and thus a particular vehicle scheduled to be picked up may be in the process of maintaining exhaust catalyst temperature above the light-off temperature. However, the customer may submit a request during such time, of a desire to pick the vehicle up at a later time. In such an example, the software application may query a plurality of schedules for a plurality of vehicles, in order to determine if there is a possibility or likelihood that another vehicle will be available at the later time, where it makes more sense from a fuel economy and emissions standpoint to pair the customer with the other vehicle. For example, the other vehicle may be scheduled to arrive at the pickup location within five minutes of the later scheduled pickup time. In such an example, it may be more fuel efficient and/or better for emissions for the software application to send instructions to the controller of the initial vehicle, instructing it to discontinue the exhaust catalyst heating operation and let the temperature of the exhaust catalyst decay to ambient temperature. The software application may then coordinate with the customer to pair the customer with the vehicle arriving at the later time. In this way, the customer may be paired with a vehicle for which an exhaust catalyst temperature raising operation does not have to be conducted. Further, by aborting the exhaust catalyst temperature raising operation for the initial vehicle, fuel economy may be improved as opposed to maintaining the temperature of the exhaust catalyst above the light-off temperature until the initially scheduled pickup.

Said another way, the software application, in an effort to minimize impact to fuel economy, maximize reduction in undesired emissions, and satisfy customer requests, may in some examples instruct a controller of a vehicle to discontinue a routine for maintaining exhaust catalyst temperature above light-off temperature. In another example, in response to a scheduling change request from a customer, the software application may update a scheduled pickup time for a particular vehicle to a later time (or an earlier time) and send such updated information to the vehicle controller of the particular vehicle scheduled for pickup. The controller of the vehicle may then adapt parameters of the exhaust catalyst temperature raising operation in order to comply with the updated information received from the software application. For example, in a situation where the customer requests a later pickup time than initially requested, the controller may activate the engine for a longer period of time when appropriate, to raise temperature of the exhaust catalyst to a higher level than initially determined. In some examples, the software application itself may provide instructions to the controller as to how long to activate the engine (or electric heater). In this way, the temperature of the exhaust catalyst may be maintained above the light-off temperature until the later pickup time, while also minimizing number of exhaust catalyst heating operations until the later pickup time. In still another example where the customer requests an earlier pickup time, the engine may be activated for a shorter period of time when appropriate (for example under instructions at the controller of the vehicle or via instructions received from the software application at the controller of the vehicle), to raise temperature of the exhaust catalyst to a lower level than initially determined. In this way, the temperature of the exhaust catalyst may be maintained above the light-off temperature until the earlier pickup time, without activating the engine (or electric heater) for longer periods of time than necessary. In yet another example where the customer requests an earlier pickup time, it may be determined that no exhaust catalyst temperature raising operation may be performed, as per the earlier pickup time, it is predicted that the exhaust catalyst temperature is not expected to drop below the light-off temperature by the time the vehicle is picked up.

Turning now to FIG. 10, an example timeline 1000 is shown, depicting the selection of a parking location during a vehicle stopping operation for a vehicle that is scheduled to be dropped off and picked up at a certain time and location, the time and locations scheduled via a customer using a software application on a mobile computing device, such as the software application described above with regard to FIGS. 9A-B. Timeline 1000 includes plot 1002 depicting engine status of a vehicle, where engine status is on or off, over time. Timeline 1000 further includes arrows 1003 and 1004, indicating a scheduled drop-off time and pickup time, respectively, for the car sharing vehicle which has been arranged by the customer as discussed above. The times are depicted in relation to a time of engine-on and off. Timeline 1000 further includes plot 1006, depicting the fuel vapor load of a fuel system canister coupled to a fuel system of the vehicle. Timeline 1000 further includes plot 1008, indicating an actual exhaust catalyst temperature, as indicated for example, by the exhaust catalyst temperature sensor (e.g. 258). Timeline 1000 further includes plot 1010, indicating the degree of solar loading at a parking location where the vehicle is parked in between drive cycles.

Prior to t1, the engine is on (plot 1002), and thus it may be understood that the engine is combusting air and fuel. At this time, the vehicle has been accessed by a first customer, thus it may be understood that the vehicle is in operation with a customer in the vehicle and that the vehicle is being driven to a desired location. In this example timeline, while not explicitly illustrated, it may be understood that the vehicle comprises an autonomous car sharing vehicle where the vehicle is driven autonomously, but in other examples the vehicle may comprise a vehicle that is driven by the particular customer, without departing from the scope of this disclosure. The vehicle will be dropped off the vehicle customer at a time represented by arrow 1003. A second customer has requested, via the software application, a pickup time shortly thereafter, and in a vicinity of the drop-off location, as represented by arrow 1004.

Between time t0 and t1, the vehicle drives the first customer to the desired location. At time t1, the desired destination is reached. Before the destination is reached and the engine is deactivated, the controller learns that the canister load is elevated. As a result, the propensity for bleed emissions is high when the vehicle is parked. Based on the elevated canister load and relatively short duration between the end of the current drive cycle (1003) and the start of the next drive cycle (1004), the controller may assign a high bleed emissions score to the vehicle. The catalyst temperature is also predicted to be elevated at the time of drop-off and the temperature is predicted to remain above a threshold temperature 1009 while parked. Thus, a low exhaust emissions score is assigned to the vehicle. In view of the elevated bleed emissions score, a parking location having a lower solar loading is recommended and the vehicle is navigated to the recommended location before the engine is deactivated. The lower solar loading location includes an enclosed parking garage in this example. While not specifically illustrated, it may be understood that the engine-off status represents a vehicle-off condition. As a result of parking the vehicle in the lower solar loading location, the bleed emissions released by the vehicle are lowered relative to a situation where the vehicle were parked in an area with higher solar loading, e.g., on the side of a road, which may have been closer to the final drop-off location and/or subsequent pick-up location. For example, if the vehicle were parked in the area with higher solar loading, bleed emissions may have occurred as per dashed segment 1005, with a larger drop in canister load. Between t1 and t2, the vehicle remains parked at the recommended location with the lower solar loading.

At t2, the vehicle is accessed by a second customer. The vehicle is picked up by the second vehicle customer at a time represented by arrow 1004. The second customer may have requested, via the software application, the pick-up represented by arrow 1004. Between time t2 and t3, the vehicle drives the second customer to the desired location. At time t3, the desired destination is reached. A third customer has requested, via the software application, a pickup time thereafter, and in a vicinity of the drop-off location, as represented by arrow 1004.

Before the destination is reached and the engine is deactivated, the controller learns that the canister load is lower. For example, canister purging opportunities may have occurred during the drive cycle between t2 and t3 resulting in a cleaner canister at t3. As a result, the propensity for bleed emissions is low when the vehicle is parked. Based on the lower canister load and relatively longer duration between the end of the current drive cycle (1003) and the start of the next drive cycle (1004), the controller may assign a low bleed emissions score to the vehicle. The catalyst temperature, on the other hand, is predicted to drop significantly after the time of drop-off due to ambient conditions and the long parking duration, and the temperature is predicted to fall below threshold temperature 1009 while parked, as indicated by dashed segment 1007. This could result in cold-start emissions at the time of the subsequent pick-up. Thus, a high exhaust emissions score is assigned to the vehicle. In view of the elevated exhaust emissions score, a parking location having a higher solar loading is recommended and the vehicle is navigated to the recommended location before the engine is deactivated. The higher solar loading location includes an open parking lot in this example. As a result of parking the vehicle in the higher solar loading location, the catalyst temperature is maintained elevated while the vehicle is parked and the catalyst remains active when the vehicle is subsequently picked up by the third customer. Between t3 and t4, the vehicle remains parked at the recommended location with the higher solar loading. At t4, the third customer picks up the vehicle from the recommended parking location and another vehicle drive cycle ensues.

By obtaining an indication of when exhaust catalyst temperature for the particular vehicle is predicted to drop below light-off temperature, and whether or not bleed emissions could occur, the indication may be communicated to the software application, in order to coordinate an environmentally friendly vehicle drop-off and pickup event where the vehicle is picked up at a time when exhaust catalyst temperature is above light-off temperature and the vehicle is parked with low bleed emissions. In this example timeline, it may be understood that the software application determines that the optimal pairing in terms of fuel economy and emissions reduction is the pairing of the second and third customers with the vehicle depicted at timeline 1000. Specifically, the software application determines that it is economical from a fuel efficiency standpoint and from an emissions standpoint to keep the exhaust catalyst above light-off temperature for the vehicle, in order to have the exhaust catalyst above light-off temperature at the time of the scheduled pickup. Likewise, it is economical from a fuel efficiency standpoint and from an emissions standpoint to keep the canister temperature reduced for the vehicle, in order to have reduced bleed emissions while the vehicle is parked. It may be understood that there may be other options for vehicle pickup by the second and third customers, however the other options may not be ideal from a fuel economy and emissions standpoint. For example, one of the other options may be a vehicle for which a cold start of the engine would have to be conducted at the scheduled pickup time, for example a vehicle that was turned-off greater than a threshold duration prior to the scheduled pickup time (e.g. greater than 2 hours prior). By pairing the third customer with the vehicle depicted at timeline 1000, for which the exhaust catalyst temperature may be maintained above light-off temperature until the scheduled pickup, release of undesired emissions to the environment may be reduced, and fuel economy improved. In situations where a particular customer cannot be paired with a vehicle for which exhaust catalyst temperature is above light-off temperature at the time requested, then the customer may be paired with a vehicle for which exhaust catalyst temperature is below light-off temperature at the time of pickup. Thus, it may be understood that the software application may take into account all information related to status of vehicles participating the car-sharing model, and the schedule pertaining to desired pickup location and time, in order to coordinate environmentally friendly pickup of vehicles when possible. In this way, for the entire fleet of vehicles participating in the car-sharing model, overall emissions related to cold-start emissions may be reduced, and overall fuel economy improved.

Furthermore, the software application may retrieve other relevant parameters from the vehicle controller, such as status or charge level of the onboard energy storage device, fuel level, an inferred amount of heat rejection from the engine (which may be based on mass air flow for the previous drive cycle summed over time), etc. The software application may further acquire information from one or more servers related to current and future weather conditions. Based on the modeled temperature decay and canister load decay, and the requested drop-off and pickup times, and the further information retrieved from the controller and from one or more servers related to weather conditions, the software application may determine how the parking operation may be conducted.

While the above-discussed instructions are indicated to be provided via the software application, in other examples, all such instructions other than the coordinating of the scheduling of the vehicle pickup time may be stored at the controller as executable instructions in non-transitory memory. For example, the controller of the vehicle may receive the scheduled request via the software application, and the controller of the vehicle may determine where to park, etc., similar to that described above when the instructions are provided via the software application.

In this way, bleed emissions and cold start exhaust emissions may be reduced while a vehicle is parked until a next scheduled vehicle pickup event. As a result, engine-start events at the next scheduled pickup events may be less polluting and better in terms of fuel economy than cold-start events. Likewise, vehicle parking events may be more environmentally friendly. In this way, emissions may be reduced for vehicles participating in car-sharing models. The technical effect is to recognize that for vehicles participating in car-sharing models, because requested pickup time and location is scheduled in advance, and because autonomous vehicles have more flexibility in parking location preferences, it may be possible to coordinate parking selections in an environmentally friendly fashion that reduces overall emissions for a fleet of vehicles participating in the car-sharing model. It is further recognized that by learning customer drive habits and/or via V2I2V technology, it may be inferred as to when a subsequent engine restart request may be received at the vehicle controller and parking selections can be adjusted accordingly to maintain exhaust catalyst temperatures in a target range.

One example method comprises: selecting a parking location for a vehicle based on each of a propensity for bleed emissions and/or cold-start exhaust emissions over a duration of vehicle parking; and navigating the vehicle to the selected parking location. In the preceding example, additionally or optionally, the selecting includes selecting a first parking location having a lower solar loading when the propensity for bleed emissions is higher than a threshold and selecting a second parking location having a higher solar loading when the propensity for cold-start exhaust emissions is higher than the threshold. In any or all of the preceding examples, additionally or optionally, the first parking location includes an open parking lot and the second parking location includes an enclosed parking lot. In any or all of the preceding examples, additionally or optionally, the method further comprises estimating the propensity for bleed emissions based on a weighted combination of each of fuel system conditions and evaporative emissions system conditions. In any or all of the preceding examples, additionally or optionally, the fuel system conditions include fuel tank fill level, fuel tank integrity, and fuel tank configuration, and wherein the evaporative emissions system conditions include canister load, canister integrity, and canister configuration. In any or all of the preceding examples, additionally or optionally, the method further comprises estimating the propensity for cold-start exhaust emissions based on a weighted combination of each of exhaust catalyst temperature, average engine load, traffic along a planned route of travel, and ambient conditions. In any or all of the preceding examples, additionally or optionally, the vehicle is a shared vehicle, and the propensity for cold-start exhaust emissions and the propensity for bleed emissions is further estimated as a function of predicted duration of parking at the parking location, the predicted duration based on a subsequent pick-up time of the vehicle. In any or all of the preceding examples, additionally or optionally, the vehicle is an autonomous vehicle, and the navigating the vehicle to the selected parking location is accomplished in an absence of a vehicle operator. In any or all of the preceding examples, additionally or optionally, the selecting is in response to an operator indicated preference for operating the vehicle in accordance with an environmentally friendly profile.

Another example method for a vehicle comprises: via a controller, providing instructions to park a vehicle in a location with a degree of solar loading that reduces a potential for bleed emissions from a fuel system and/or an evaporative emissions system of the vehicle, where the location is selected by the controller based on a metric having inputs that include a plurality of variables related to an integrity of the fuel system and/or the evaporative emissions system. In the preceding example, additionally or optionally, the vehicle is parked at the end of a first drive cycle, and wherein the location is further selected based on a potential for exhaust emissions on an engine start at a second drive cycle, immediately following the first drive cycle, the potential for exhaust emissions calculated based on a predicted change in exhaust catalyst temperature over a duration of parking the vehicle at the location. In any or all of the preceding examples, additionally or optionally, the vehicle is one of a plurality of vehicles participating in a car-sharing model, and wherein the first drive cycle includes a scheduled drop-off location and time selected by a first customer, and the second drive cycle includes a scheduled pickup time and location selected by a second customer, the first and second customer communicatively coupled to the controller of the vehicle via a software application. In any or all of the preceding examples, additionally or optionally, the location is a first parking location having a lower degree of solar loading when the potential for bleed emissions is higher than the potential for exhaust emissions, and wherein the location is a second parking location having a higher degree of solar loading when the potential for exhaust emissions is higher than the potential for bleed emissions. In any or all of the preceding examples, additionally or optionally, the first parking location is shielded from direct sunlight as compared to the second parking location.

Another example vehicle system comprises: an engine having an exhaust catalyst; a fuel system having a fuel vapor canister coupled to a fuel tank; an interface for receiving a vehicle operating profile selection from a vehicle operator; and a controller communicatively coupled to one or more vehicle operators via a network, wherein the controller is configured with computer readable instructions stored on non-transitory memory that when executed cause the controller to: at the end of a given drive cycle, select a first parking location as a function of potential for bleed emissions from the fuel system and exhaust emissions from the exhaust catalyst when a first vehicle operating profile is selected; select a second parking location as a function of distance to destination when a second vehicle operating profile is selected; and navigate the vehicle to the selected parking location. In the preceding example, additionally or optionally, the first vehicle operating profile includes a preference for environmental friendliness, and wherein the second vehicle operating profile includes a preference for convenience. In any or all of the preceding examples, additionally or optionally, the controller includes further instructions that cause the controller to select the first parking location when a parking duration between the given drive cycle and a subsequent drive cycle is shorter, and select the second parking location when the parking duration between the given drive cycle and the subsequent drive cycle is longer. In any or all of the preceding examples, additionally or optionally, the first parking location has a lower solar loading than the second parking location. In any or all of the preceding examples, additionally or optionally, the controller receives information regarding the given drive cycle from a first vehicle operator including a first drop-off time and location, and wherein the controller receives information regarding the subsequent drive cycle from a second vehicle operator including a second pick-up time and location. In any or all of the preceding examples, additionally or optionally, the controller includes further instructions to estimate the potential for bleed emissions from the fuel system based on fuel system variables including fuel tank fill level and canister load, estimate the potential for exhaust emissions based on exhaust catalyst temperature and ambient conditions, and wherein each of the potential for bleed emissions and potential for exhaust emissions is further based on the information regarding the given drive cycle and the subsequent drive cycle.

In a further representation, a method comprises: selecting a first parking location for a vehicle as opposed to a second parking location for the vehicle based on an inference that by parking the vehicle in the first parking location, bleed emissions while the vehicle is parked will be lower than in a case where the vehicle is parked in the second location; and controlling the vehicle to the first parking location. In the preceding example, the first parking location is shielded from direct sunlight as compared to the second parking location. In any of the preceding examples, the inference is based on a determined metric that takes into account a number of factors related to an integrity of a fuel system and an evaporative emissions system of the vehicle. In any of the preceding examples, the method further comprises selecting the first parking location when the determined metric includes a score that is above a threshold score, and selecting the second parking location when the determined metric includes the score being below the threshold score. In any of the preceding examples, the determined metric is a function of one or more environmental conditions including forecast weather data that includes cloudiness, ambient temperature, wind, and precipitation. In any of the preceding examples, the vehicle is an autonomous vehicle, and where controlling the vehicle to the first parking location is accomplished in an absence of a vehicle operator. In any of the preceding examples, the selecting is in response to a command from the vehicle controller to a vehicle operator of a request to park the vehicle in the first location as compared to the second location, and wherein the controlling the vehicle to the first parking location is via a vehicle operator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
  selecting a parking location for a vehicle based on each of a propensity for bleed emissions and/or cold-start exhaust emissions over a duration of vehicle parking; and
  navigating the vehicle to the selected parking location, wherein the selecting includes selecting a first parking location having a lower solar loading when the propensity for bleed emissions is higher than a threshold and selecting a second parking location having a higher solar loading when the propensity for cold-start exhaust emissions is higher than the threshold.

2. The method of claim 1, where the vehicle is an autonomous vehicle, and wherein the navigating the vehicle to the selected parking location is accomplished in an absence of a vehicle operator.

3. The method of claim 1, wherein the selecting is in response to an operator indicated preference for operating the vehicle in accordance with an environmentally friendly profile.

4. A method comprising:
  selecting a parking location for a vehicle based on each of a propensity for bleed emissions and/or cold-start exhaust emissions over a duration of vehicle parking; and
  navigating the vehicle to the selected parking location, wherein the first parking location includes an open parking lot and the second parking location includes an enclosed parking lot.

5. A method comprising:
  selecting a parking location for a vehicle based on each of a propensity for bleed emissions and/or cold-start exhaust emissions over a duration of vehicle parking; and
  navigating the vehicle to the selected parking location, the method further comprising estimating the propensity for bleed emissions based on a weighted combination of each of fuel system conditions and evaporative emissions system conditions.

6. The method of claim 5, wherein the fuel system conditions include fuel tank fill level, fuel tank integrity, and fuel tank configuration, and wherein the evaporative emissions system conditions include canister load, canister integrity, and canister configuration.

7. The method of claim 5, further comprising, estimating the propensity for cold-start exhaust emissions based on a weighted combination of each of exhaust catalyst temperature, average engine load, traffic along a planned route of travel, and ambient conditions.

8. The method of claim 5, wherein the vehicle is a shared vehicle, and wherein the propensity for cold-start exhaust emissions and the propensity for bleed emissions is further estimated as a function of predicted duration of parking at the parking location, the predicted duration based on a subsequent pick-up time of the vehicle.

9. A method for a vehicle, comprising:
  via a controller, providing instructions to park a vehicle in a location with a degree of solar loading that reduces a potential for bleed emissions from a fuel system and/or an evaporative emissions system of the vehicle, where the location is selected by the controller based on a metric having inputs that include a plurality of variables related to an integrity of the fuel system and/or the evaporative emissions system, wherein the vehicle is parked at the end of a first drive cycle, and wherein the location is further selected based on a potential for exhaust emissions on an engine start at a second drive cycle, immediately following the first drive cycle, the potential for exhaust emissions calculated based on a predicted change in exhaust catalyst temperature over a duration of parking the vehicle at the location.

10. The method of claim 9, wherein the vehicle is one of a plurality of vehicles participating in a car-sharing model, and wherein the first drive cycle includes a scheduled drop-off location and time selected by a first customer, and the second drive cycle includes a scheduled pickup time and location selected by a second customer, the first and second customer communicatively coupled to the controller of the vehicle via a software application.

11. The method of claim 9, wherein the location is a first parking location having a lower degree of solar loading when the potential for bleed emissions is higher than the potential for exhaust emissions, and wherein the location is a second parking location having a higher degree of solar loading when the potential for exhaust emissions is higher than the potential for bleed emissions.

12. The method of claim 11, wherein the first parking location is shielded from direct sunlight as compared to the second parking location.

13. A vehicle system, comprising:
an engine having an exhaust catalyst;
a fuel system having a fuel vapor canister coupled to a fuel tank;
an interface for receiving a vehicle operating profile selection from a vehicle operator; and
a controller communicatively coupled to one or more vehicle operators via a network, wherein the controller is configured with computer readable instructions stored on non-transitory memory that when executed cause the controller to:
at the end of a given drive cycle,
select a first parking location as a function of potential for bleed emissions from the fuel system and exhaust emissions from the exhaust catalyst when a first vehicle operating profile is selected;
select a second parking location as a function of distance to destination when a second vehicle operating profile is selected; and
navigate the vehicle to the selected parking location.

14. The system of claim 13, wherein the first vehicle operating profile includes a preference for environmental friendliness, and wherein the second vehicle operating profile includes a preference for convenience.

15. The system of claim 13, wherein the controller includes further instructions that cause the controller to select the first parking location when a parking duration between the given drive cycle and a subsequent drive cycle is shorter, and select the second parking location when the parking duration between the given drive cycle and the subsequent drive cycle is longer.

16. The system of claim 15, wherein the first parking location has a lower solar loading than the second parking location.

17. The system of claim 15, wherein the controller receives information regarding the given drive cycle from a first vehicle operator including a first drop-off time and location, and wherein the controller receives information regarding the subsequent drive cycle from a second vehicle operator including a second pick-up time and location.

18. The system of claim 17, wherein the controller includes further instructions to estimate the potential for bleed emissions from the fuel system based on fuel system variables including fuel tank fill level and canister load, estimate the potential for exhaust emissions based on exhaust catalyst temperature and ambient conditions, and wherein each of the potential for bleed emissions and potential for exhaust emissions is further based on the information regarding the given drive cycle and the subsequent drive cycle.

* * * * *